US011528076B1

(12) United States Patent
Bily et al.

(10) Patent No.: US 11,528,076 B1
(45) Date of Patent: Dec. 13, 2022

(54) COMMUNICATION TERMINAL

(71) Applicant: Apple Inc., Cupertino, CA (US)

(72) Inventors: Adam H. Bily, Cupertino, CA (US); Carlo di Nallo, Belmont, CA (US); Matthew N. Ettus, Monte Sereno, CA (US); Michael D. Trela, San Carlos, CA (US); Simone Paulotto, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/575,895

(22) Filed: Sep. 19, 2019

Related U.S. Application Data

(60) Provisional application No. 62/734,693, filed on Sep. 21, 2018.

(51) Int. Cl.
*H04B 7/185* (2006.01)

(52) U.S. Cl.
CPC ..... *H04B 7/18513* (2013.01); *H04B 7/18515* (2013.01)

(58) Field of Classification Search
CPC .... H01Q 3/00–46; H01Q 1/241; H01Q 1/288; H01Q 21/00–30; H01Q 19/005; H01Q 25/00–04; H04B 7/18513; H04B 7/18515
See application file for complete search history.

(56) References Cited

U.S. PATENT DOCUMENTS

| | | | | |
|---|---|---|---|---|
| 5,861,844 A | * | 1/1999 | Gilmore | H01Q 3/24 342/374 |
| 6,686,867 B1 | * | 2/2004 | Lissel | H01Q 25/002 342/70 |
| 2005/0099357 A1 | * | 5/2005 | Durham | H01Q 21/062 343/795 |
| 2008/0030416 A1 | * | 2/2008 | Lee | H01Q 1/1292 343/754 |

(Continued)

OTHER PUBLICATIONS

Yurduseven, Ozan, Wideband Integrated Lens Antennas for Terahertz Deep Space Investigation, Ph.D. Thesis, 2016, Delft University of Technology, Netherlands.

(Continued)

*Primary Examiner* — Raymond S Dean
(74) *Attorney, Agent, or Firm* — Treyz Law Group, P.C.; Michael H. Lyons

(57) ABSTRACT

A communication terminal may include control circuitry and an array of antenna modules. Each module may include radiators on a substrate, a lens overlapping the radiators, a transceiver chain, and switching circuitry. The control circuitry may control the switching circuitry to activate a set of one or more radiators in a given module. The control circuitry may control the transceiver chain in that module to convey signals at a selected phase using each of the active radiators. Each of the active radiators may convey the signals over signal beams oriented in different directions by the lens. The control circuitry may adjust the active radiators in each module and may adjust the selected phase for each (Continued)

of the modules to generate a combined signal beam in a desired direction. The combined signal beam may be generated using signals from the active radiators in two or more modules across the array.

20 Claims, 15 Drawing Sheets

(56) References Cited

U.S. PATENT DOCUMENTS

| | | | | |
|---|---|---|---|---|
| 2010/0328161 | A1* | 12/2010 | Tiezzi | H01P 1/047 |
| | | | | 343/700 MS |
| 2016/0156409 | A1* | 6/2016 | Chang | H04B 7/208 |
| | | | | 370/315 |
| 2017/0054211 | A1* | 2/2017 | Gallagher | H01Q 21/065 |
| 2018/0269576 | A1* | 9/2018 | Scarborough | H01Q 3/14 |
| 2019/0252801 | A1* | 8/2019 | Mahanfar | H01Q 5/42 |
| 2019/0305848 | A1* | 10/2019 | Laurent | H04B 10/572 |

OTHER PUBLICATIONS

Neto, Andrea, UWB, Non Dispersive Radiation From the Planarly Fed Leaky Lens Antenna—Part 1: Theory and Design, IEEE Transactions on Antennas and Propagation, Jul. 2010, vol. 58, No. 7.

Abbaspour-Tamijani, Abbas, et al., Enhancing the Directivity of Phased Array Antennas Using Lens-Arrays, Progress in Electromagnetics Research M, 2013, pp. 41-64, vol. 29.

* cited by examiner

COMMUNICATION TERMINAL

This application claims the benefit of provisional patent application No. 62/734,693, filed Sep. 21, 2018, which is hereby incorporated by reference herein in its entirety.

FIELD

This relates generally to communication terminals, including communication terminals with wireless components for use in satellite communications systems.

BACKGROUND

Communication terminals such as communication terminals integrated into electronic devices, satellites, or other systems often include wireless components. The wireless components include one or more antennas that convey wireless data with other communication terminals in a wireless communications system.

In long-range wireless communications systems such as satellite communications systems, communication terminals typically convey radio-frequency signals over long distances such as tens, hundreds, or thousands of miles. These distances subject the radio-frequency signals to substantial signal attenuation during propagation. In addition, the communication terminals often need to maintain several concurrent wireless links with multiple other communication terminals in the satellite communications system.

If care is not taken, wireless components that support this type of long-range communication can consume excessive resources in the communication terminal such as power, space, and weight. It can also be challenging to maintain satisfactory wireless link quality between the communication terminals, particularly over long distances such as those associated with satellite communications systems.

SUMMARY

A communication terminal in a communications system such as a satellite communications system may include control circuitry and an array of antenna modules. Each antenna module may include an array of antenna radiators on a substrate and a lens overlapping the array of radiators. Each antenna module may include a transceiver chain that includes a transceiver, a phase shifter, and an amplifier shared by each of the radiators in the module. Each antenna module may include switching circuitry between the radiators and the transceiver chain.

The control circuitry may control the switching circuitry to activate a set of one or more radiators in a given module. The control circuitry may control the transceiver chain in the module to convey radio-frequency signals at a selected phase using each of the active radiators (e.g., by applying a selected phase shift with the phase shifter in the transceiver chain). Each of the active radiators may transmit and receive the radio-frequency signals over signal beams oriented in different directions by the lens over the module. For example, a first of the active radiators and the lens may transmit the radio-frequency signals at the selected phase in a first direction whereas a second of the active radiators and the lens may transmit the radio-frequency signals at the selected phase in a second direction.

The control circuitry may adjust the active radiators in each module and may adjust the phase shifts provided by each module to generate a combined signal beam oriented in a desired direction. The combined signal beam may be generated using phase-shifted radio-frequency signals from the active radiators in two or more modules across the array of modules. Each module may include additional arrays of interleaved radiators for covering other frequencies. Each module may cover multiple polarizations if desired. Each lens may convey multiple beams of radio-frequency signals in different directions and at different frequencies while maintaining polarization. This may increase data throughput, may support multiple concurrent wireless links with satisfactory link quality over a wide field of view, and may reduce space consumption, power consumption, and manufacturing cost relative to communications terminals having flat panel phased antenna arrays, as examples.

DETAILED DESCRIPTION

A communications system such as a satellite communications network may include a communication terminal. The communication terminal may include an array of antenna modules. Each antenna module may include a transceiver chain and an array of antenna radiators (sometimes referred to herein as radiators, elements, resonant elements, or resonant antenna elements). The radiators in each module may share the same transceiver chain. Each transceiver chain may include a corresponding transceiver, phase shifter, and amplifier. Switching circuitry may be coupled between each radiator in a given antenna module and the corresponding transceiver chain.

Each antenna module may include a lens overlapping some or all of the radiators in that module. Control circuitry may selectively activate different radiators in a given module to generate beams of radio-frequency signals in different pointing directions through the lens. Each lens and each antenna module may support multiple concurrent beams of signals and thus multiple concurrent wireless links with different external communication terminals.

If desired, the control circuitry may adjust the phase shifts provided by the phase shifter in each antenna module to perform beam steering operations across the array of antenna modules. For example, the control circuitry may activate a first radiator in a first module, may activate a second radiator in a second module, and may phase the first and second modules so that the first and second radiators produce a combined signal beam in a particular pointing direction.

Each antenna module may include additional arrays of radiators and additional transceiver chains for covering other frequencies if desired. Operating the antenna modules using multiple frequency bands may allow the array of antenna modules to support a greater data throughput per antenna volume relative to flat panel phased antenna arrays. Data throughput may be further increased using multiple different polarizations. In this way, the communication terminal may exhibit enhanced data throughputs, may maintain multiple concurrent wireless links with satisfactory link quality over a wide field of view, and may reduce space consumption, power consumption, and manufacturing cost relative to communications terminals having flat panel phased antenna arrays.

Figure 1:
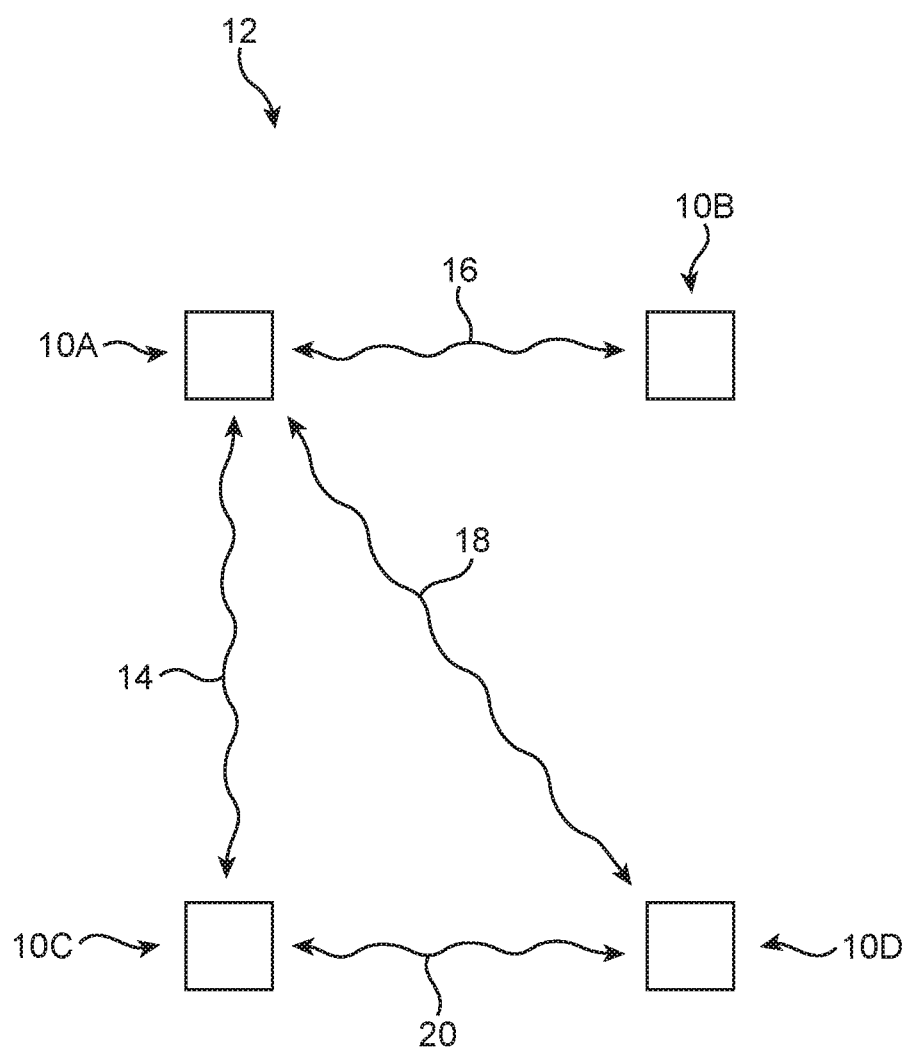
FIG. 1 is a schematic diagram of an illustrative communications system (network) that includes multiple communication terminals in accordance with some embodiments.

FIG. 1 is a diagram of an illustrative communications system 12. Communications system 12 (sometimes referred to herein as network 12 or communications network 12) may include two or more communication terminals 10 that communicate over wireless links. Each communication terminal 10 may include wireless components such as wireless communications circuitry that transmits and/or receives radio-frequency signals using one or more corresponding antennas. Arrangements in which communications system 12 is a satellite communications system that includes communication terminals implemented on one or more satellites (satellite terminals) is sometimes described herein as an example. Communications system 12 may therefore sometimes be referred to herein as satellite system 12, satellite communications system 12, or satellite network 12.

In the example of FIG. 1, communications system 12 includes a first communication terminal 10A, a second wireless communication terminal 10B, a third wireless communication terminal 10C, and a fourth wireless communication terminal 10D. Communication terminals 10A-10D may be integrated within electronic devices (e.g., cellular telephones, tablet computers, desktop computers, laptop computers, wearable electronic devices, media players, televisions, set-top boxes, etc.), buildings, kiosks, vehicles, satellites, wireless base stations, wireless access points, satellite network ground stations (gateways), or any other desired systems. In one suitable arrangement that is sometimes described herein as an example, communication terminal 10A is implemented on a satellite (e.g., a medium earth orbit (MEO) satellite, a low earth orbit (LEO) satellite, a geosynchronous (GEO) satellite, etc.), communication terminal 10B is implemented on a satellite, communication terminal 10C is implemented on a satellite network ground station, and communication terminal 10D is implemented on an electronic device, within a building, kiosk, vehicle, or other system (e.g., communication terminal 10D may be implemented in a portable electronic device or user equipment such as a cellular telephone, tablet computer, or laptop computer, whereas communication terminal 10B is implemented on a larger, stationary ground station).

As shown in FIG. 1, communication terminal 10A may communicate with communication terminal 10B over wireless link 16 (e.g., a satellite-to-satellite link), may communicate with communication terminal 10C over wireless link 14 (e.g., a satellite-to-gateway link), and/or may communicate with communication terminal 10D over wireless link 18 (e.g., a satellite-to-user equipment link). Communication terminal 10C may communicate with communication terminal 10D over wireless link 20 (e.g., a gateway-to-user equipment link). Intervening network components such as wireless base stations, access points, servers, or other networks (e.g., local area networks, the internet, etc.) may additionally or alternatively be used to convey signals between communication terminal 10C and communication terminal 10D. If desired, communication terminal 10C may relay data between communication terminal 10D and communication terminal 10A over links 14 and 20 (e.g., so that communication terminal 10A may relay the wireless data to communication terminal 10B, other user equipment, or other ground stations that are located far away from communication terminal 10D). Similarly, communication terminal 10A may relay data between communication terminal 10D and communication terminal 10B over links 18 and 16. Links 16, 18, 14, and 20 may be bidirectional or unidirectional (e.g., data may be conveyed both to terminal 10A from terminal 10C and from terminal 10A to terminal 10C over link 14 or may be conveyed in only a single direction between terminals 10A and 10C).

This example is merely illustrative. In general, communications system 12 may include any desired number of communication terminals 10A and 10B (e.g., communication terminals implemented on satellites), any desired number of communication terminals 10C (e.g., communication terminals implemented on ground stations), any desired number of communication terminals 10D (e.g., any desired user equipment devices), and/or any desired number of communication terminals implemented on other systems such as wireless access points and/or wireless base stations. In practice, communication terminals in communications system 12 such as communication terminals 10A, 10B, and 10C of FIG. 1 may need to perform wireless communications with two, three, four, or more than four (e.g., tens, hundreds, thousands, etc.) other communication terminals 10 in communications system 12.

Figure 2:
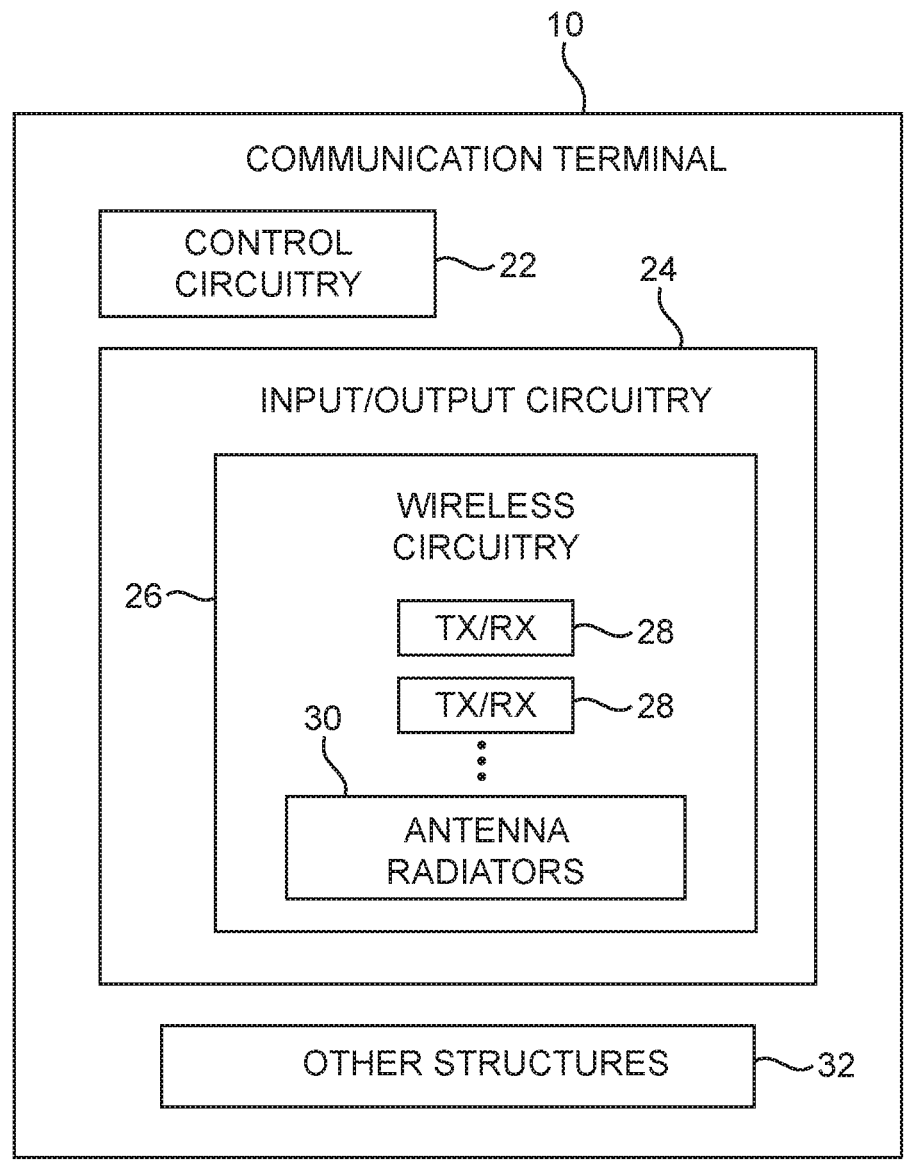
FIG. 2 is a schematic diagram of an illustrative communication terminal in accordance with some embodiments.

FIG. 2 is a diagram of an illustrative communication terminal 10 that may perform wireless communications in communications system 12. Communication terminal 10 of FIG. 2 may be, for example, used to form communication terminals 10A or 10B (e.g., may be implemented on a satellite in system 12), to form communication terminal 10C (e.g., may be implemented on a ground station in system 12), to form communication terminal 10D (e.g., may be implemented on user equipment in system 12), or to form any other desired communication terminal for system 12.

As shown in FIG. 2, communication terminal 10 may include control circuitry 22. Control circuitry 22 may include storage such as nonvolatile memory (e.g., flash memory or other electrically-programmable-read-only memory), volatile memory (e.g., dynamic or static random-access-memory), hard disk drive storage, etc. Control circuitry 22 may also include processing circuitry that controls the operation of communication terminal 10. Processing circuitry in control circuitry 22 may include one or more microprocessors, digital signal processors, microcontrollers, application specific integrated circuits, field programmable gate arrays, baseband processor integrated circuits, etc.

Control circuitry 22 may be used to run software on communication terminal 10, such as software applications, operating system functions, etc. Control circuitry 22 may be used in implementing wireless communications protocols. Wireless communications protocols that may be implemented using control circuitry 22 include satellite communications protocols, internet protocols, wireless local area network protocols (e.g., IEEE 802.11 protocols—sometimes referred to as WiFi®), protocols for other short-range wireless communications links such as the Bluetooth® protocol or other wireless personal area network protocols, IEEE 802.11ad protocols, cellular telephone protocols, MIMO protocols, antenna diversity protocols, etc.

Communication terminal 10 may include input-output circuitry 24. Input-output circuitry 24 may include wireless circuitry 26 (sometimes referred to herein as wireless communications circuitry 26) for communicating wirelessly with external equipment (e.g., other communication terminals 10 in communications system 12 of FIG. 1). Wireless circuitry 26 may include radio-frequency (RF) transceiver circuitry such as one or more radio-frequency transceivers 28. Radio-frequency transceivers 28 may each be formed from one or more integrated circuits and may include mixer circuitry (e.g., up-converter circuitry for converting from baseband to radio frequencies and down-converter circuitry for converting from radio frequencies to baseband frequencies), analog-to-digital converter circuitry, digital-to-analog converter circuitry, power amplifier circuitry, low-noise amplifier circuitry, passive radio-frequency components (e.g., filter circuitry, impedance matching circuitry, etc.), etc. Wireless circuitry 26 may also include switching circuitry, radio-frequency transmission lines, one or more antenna radiators 30 (e.g., antenna radiators in antenna modules that are phased to produce a phased array antenna), and other circuitry for handling radio-frequency wireless signals.

Transceivers 28 may each be satellite communications transceivers. Transceivers 28 may transmit and/or receive radio-frequency signals in any desired satellite communications (frequency) bands using antenna radiators 30. Communications bands handled by transceivers 28 may include IEEE bands such as the IEEE $K_a$ band (26.5-40 GHz), $K_u$ band (12-18 GHz), K band (18-27 GHz), V band (40-75 GHz), W band (75-110 GHz), X band (8-12 GHz), C band (4-8 GHz), ISO bands such as the ISO Q band (33-50 GHz), and/or any other desired bands (e.g., bands at centimeter wave and millimeter wave frequencies or at frequencies under 10 GHz). If desired, transceivers 28 may include other transceiver circuitry for handling wireless local area network communications, wireless personal area network communications, cellular telephone communications, or other non-satellite and/or terrestrial communications using antenna radiators 30. Satellite communications data conveyed by transceivers 28 and antenna radiators 30 may include media data (e.g., streaming video, television data, satellite radio data, etc.), voice data (e.g., telephone voice data), internet data, and/or any other desired data.

Antenna radiators 30 (sometimes referred to herein as radiators 30, elements 30, resonant elements 30, or resonant antenna elements 30) may include radiators formed using any desired types of antenna structures such as patch antenna structures, stacked patch antenna structures, dipole antenna structures, monopole antenna structures, inverted-F antenna structures, slot antenna structures, planar inverted-F antenna structures, cavity-backed antenna structures, waveguide antenna structures, helical antenna structures, Yagi antenna structures, hybrids of these and/or other types of antenna structures, etc. Different radiators 30 may be used to cover different frequency bands or the same antennas may be used to cover different frequency bands if desired. Radiators 30 and one or more transceivers 28 may transmit and/or receive radio-frequency signals (e.g., radio-frequency signals that convey wireless data) with another communication terminal in communications system 12 over a corresponding wireless link (e.g., using links such as links 16, 18, 14, and/or 20 of FIG. 1). Radiators 30 and transceivers 28 may be used to concurrently convey wireless data with multiple external communication terminals over multiple separate wireless links (e.g., communication terminal 10 may maintain multiple wireless links with other communication terminals at any given time).

Input-output circuitry 24 may include other input-output devices if desired. Input-output devices may be used to allow data to be supplied to communication terminal 10 and to allow data to be provided from communication terminal 10 to external devices (communication terminals). These input-output devices may include data port devices, user interface devices, and other input-output components. For example, input-output devices in communication terminal 10 may include displays (e.g., touch screens or displays without touch sensitivity), keyboards, touch pads, key pads, buttons, scrolling wheels, joysticks, cameras, infrared sensors, microphones, speakers, light sources, status indicators, audio jacks, accelerometers or other motion sensors, a compass, proximity sensors, magnetic sensors, capacitance sensors, and any other desired sensors and/or input-output components.

Communication terminal 10 may also include other structures 32. Other structures 32 may include support structures such as a housing (e.g., a housing having walls formed from metal and/or dielectric materials), radome, frame, enclosure, chassis, case, wheels, windows, etc. Other structures 32 may include power source devices, solar panels for generating electricity to power wireless circuitry 26 (e.g., in scenarios where communication terminal 10 of FIG. 2 forms communication terminal 10A of FIG. 1), propulsion systems, etc.

Any desired antenna structures may be used for implementing radiators 30. In one suitable arrangement that is sometimes described herein as an example, patch antenna structures may be used for implementing radiators 30. Radiators 30 that are implemented using patch antenna structures may sometimes be referred to herein as patch antenna radiators. An illustrative patch antenna radiator that may be used in communication terminal 10 is shown in FIG. 3.

Figure 3:
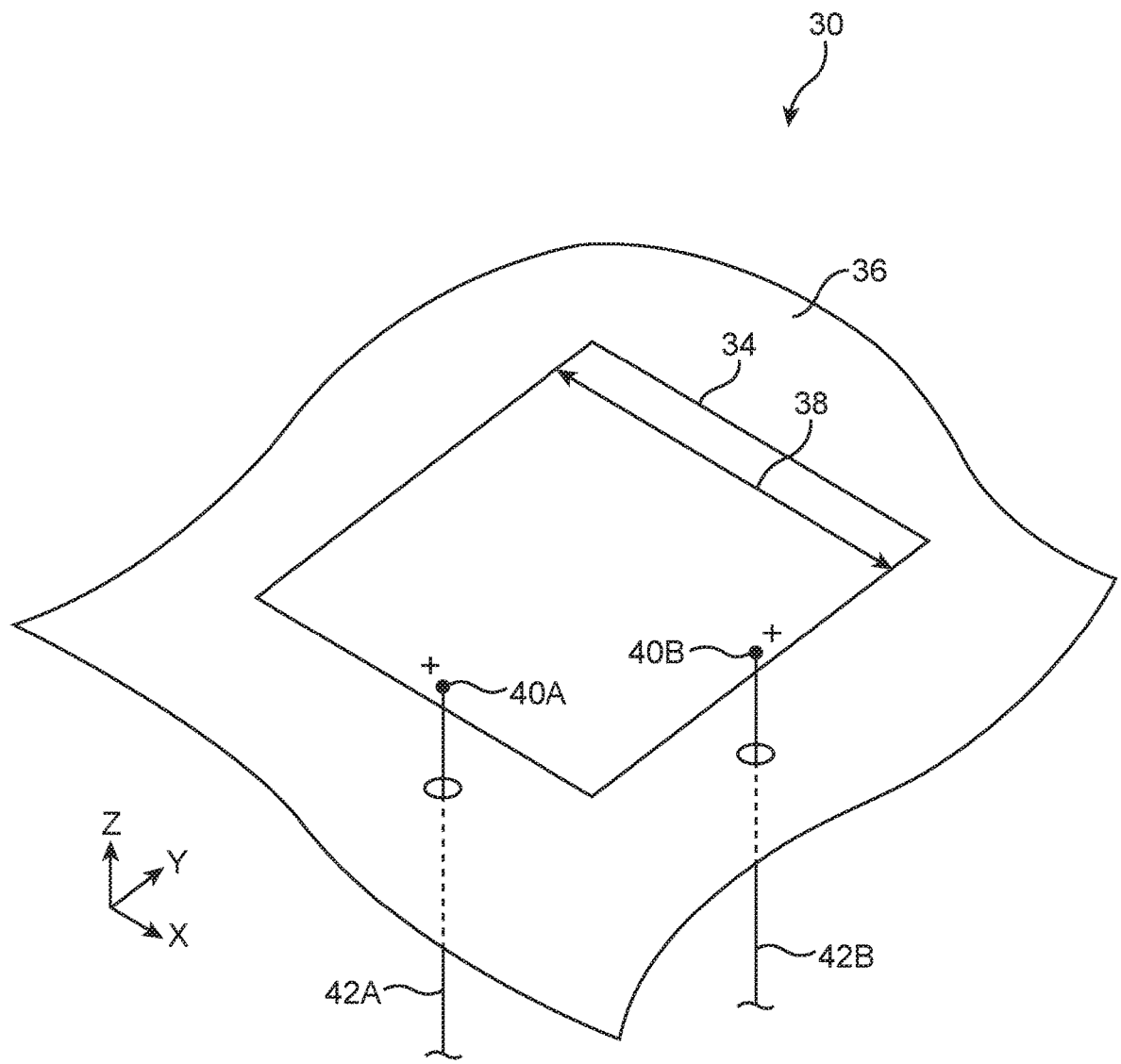
FIG. 3 is a perspective view of an illustrative patch radiator having multiple feeds in accordance with some embodiments.

As shown in FIG. 3, radiator 30 may have a patch antenna resonating element 34 that is separated from and parallel to a ground plane such as antenna ground plane 36 (sometimes referred to herein as ground 36 or antenna ground 36). Patch antenna resonating element 34 may lie within a plane such as the X-Y plane of FIG. 3 (e.g., the lateral surface area of element 34 may lie in the X-Y plane). Patch antenna resonating element 34 may sometimes be referred to herein as patch 34, patch element 34, patch resonating element 34, antenna resonating element 34, or resonating element 34. Ground plane 36 may lie within a plane that is parallel to the plane of patch element 34. Patch element 34 and ground plane 36 may therefore lie in separate parallel planes that are separated by a fixed distance. Patch element 34 and ground plane 36 may be formed from conductive traces patterned on a dielectric substrate such as ceramic, a rigid printed circuit board substrate, or a flexible printed circuit substrate.

The length of the sides of patch element 34 may be selected so that radiator 30 resonates (radiates) at a desired operating frequency. For example, the sides of patch element 34 may each have a length 38 that is approximately equal to half of the wavelength of the signals conveyed by radiator 30 (e.g., the effective wavelength given the dielectric properties of the materials surrounding patch element 34). The example of FIG. 3 is merely illustrative. Patch element 34 may have a square shape in which all of the sides of patch element 34 are the same length or may have a different rectangular shape. Patch element 34 may be formed in other shapes having any desired number of straight and/or curved edges. In another suitable arrangement, patch element 34 may have a circular or elliptical shape. If desired, patch element 34 and ground plane 36 may have different shapes and relative orientations.

To enhance the polarizations handled by radiator 30, radiator 30 may be provided with multiple feeds. As shown in FIG. 3, radiator 30 may have a first feed (port) that is coupled to a first transmission line path 42 such as transmission line path 42A and a second feed (port) that is coupled to a second transmission line path 42 such as transmission line path 42B. The first feed may have a first ground feed terminal coupled to ground plane 36 (not shown in FIG. 3 for the sake of clarity) and a first positive feed terminal 40A coupled to patch element 34. The second feed may have a second ground feed terminal coupled to ground plane 36 (not shown in FIG. 3 for the sake of clarity) and a second positive feed terminal 40B on patch element 34. Transmission line paths 42A and 42B may include coaxial cable paths, microstrip transmission lines, stripline transmission lines, edge-coupled microstrip transmission lines, edge-coupled stripline transmission lines, waveguide structures for conveying signals at millimeter wave frequencies (e.g., coplanar waveguides, grounded coplanar waveguides, or substrate integrated waveguides), transmission lines formed from combinations of transmission lines of these types, etc. Transmission line paths 42A and 42B may sometimes be referred to herein as transmission lines or radio-frequency transmission lines.

Holes, slots, or other openings may be formed in ground plane 36 to allow radio-frequency signals to be transmitted from one side of the ground plane to the other. In one suitable arrangement, transmission lines 42A and 42B may pass from below ground plane 36 to positive feed terminals 40A and 40B. In another suitable arrangement, radio-frequency signals are coupled onto the patch element wirelessly through slots or holes (e.g., the patch element may be indirectly fed). When using the first feed associated with positive feed terminal 40A, radiator 30 may transmit and/or receive radio-frequency signals having a first polarization (e.g., the electric field of the radiated signals generated by antenna current conveyed through positive feed terminal 40A may be oriented parallel to the Y-axis in FIG. 3). When using the feed associated with positive feed terminal 40B, radiator 30 may transmit and/or receive radio-frequency signals having a second orthogonal polarization (e.g., the electric field of the radiated signals generated by antenna current conveyed through positive feed terminal 40B may be oriented parallel to the X-axis of FIG. 3 so that the polarizations associated with feed terminals 40A and 40B are orthogonal to each other).

One of positive feed terminals 40A and 40B may be used at a given time so that radiator 30 operates as a single-polarization radiator or both positive feed terminals may be operated at the same time with controlled phasing between the two feeds so that radiator 30 operates with other polarizations (e.g., as a dual-polarization radiator, a circularly-polarized radiator, an elliptically-polarized radiator, etc.). If desired, the active feed may be changed over time so that radiator 30 can switch between covering vertical or horizontal polarizations at a given time. Positive feeds terminals 40A and 40B may be coupled to different phase and magnitude controllers or may both be coupled to the same phase and magnitude controller. If desired, positive feed terminals 40A and 40B may both be operated with the same phase and magnitude at a given time (e.g., when radiator 30 acts as a dual-polarization radiator). If desired, the phases and magnitudes of radio-frequency signals conveyed over positive feed terminals 40A and 40B may be controlled separately and varied over time so that radiator 30 exhibits other polarizations (e.g., circular or elliptical polarizations). The example of FIG. 3 is merely illustrative. Radiator 30 may have any desired number of feeds. Other types of antenna structures may be used if desired.

Figure 4:
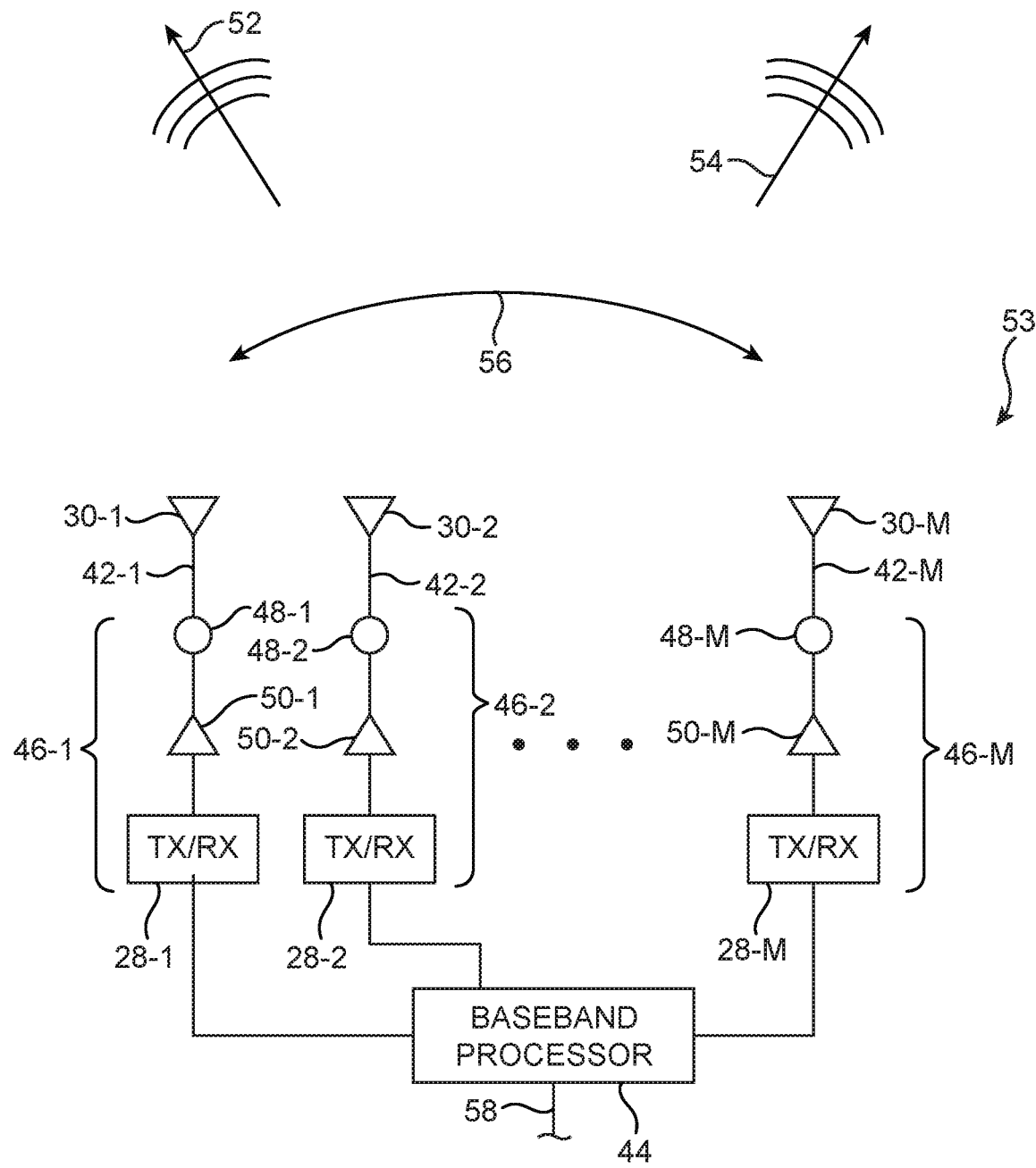
FIG. 4 is a diagram of a phased antenna array having separate transceiver chains for each radiator in the array in accordance with some embodiments.

For long-distance wireless communications links such as links 16, 14, 18, and 20 of FIG. 1, radiators 30 may need to operate with a relatively high gain in order to maintain satisfactory wireless link quality with external communications terminals (e.g., communications terminals located tens, hundreds, or thousands of miles away from communication terminal 10). In order to boost the gain handled by radiators 30 in a particular direction (e.g., towards external communications terminals), in some scenarios, the radiators are arranged in a phased antenna array. FIG. 4 shows an example of how multiple radiators 30 in communication terminal 10 may be arranged in a phased antenna array. As shown in FIG. 4, phased antenna array 53 may be coupled to signal paths such as transmission lines 42 (e.g., one or more radio-frequency transmission lines for covering one or more polarizations). For example, a first radiator 30-1 in phased antenna array 53 may be coupled to a first transmission line 42-1, a second radiator 30-2 in phased antenna array 53 may be coupled to a second transmission line 42-2, an Mth radiator 40-M in phased antenna array 53 may be coupled to an Mth transmission line 42-N, etc.

A corresponding transceiver chain 46 is coupled to each transmission line 42 (e.g., transceiver chain 46-1 is coupled to transmission line 42-1, transceiver chain 46-2 is coupled to transmission line 42-2, transceiver chain 46-M is coupled to transmission line 42-M, etc.). Each transceiver chain 46 includes a corresponding phase shifter 48, amplifier 50, and transceiver 28 (e.g., first chain 46-1 includes phase shifter 48-1 and amplifier 50-1, second chain 46-2 includes phase shifter 48-2 and amplifier 50-2, etc.). While the example of FIG. 4 only shows amplifiers 50 in a single direction (e.g., for transmitting signals) for the sake of clarity, in general, transceiver chains 46 may also include amplifiers 50 in an opposing direction (e.g., low noise amplifiers pointing towards transceivers 28 for receiving signals). Transceiver chains 46 are coupled to baseband processor 44. Baseband processor 44 is coupled to other components (e.g., an applications processor) over data path 58. Baseband processor 44 may convey baseband data for transmission to transceivers 28. Transceivers 28 may convey received baseband signals to baseband processor 44.

During signal transmission operations, transmission line paths 42 may be used to supply signals (e.g., radio-frequency signals such as millimeter wave and/or centimeter wave signals) from transceiver circuitry 28 (e.g., transceivers 28-1 through 28-M) to radiators 30 for wireless transmission to an external communication terminal. During signal reception operations, transmission line paths 42 may be used to convey signals received by radiators 30 from the external communication terminal to transceivers 28-1 through 28-M.

The use of multiple radiators 30 in phased antenna array 53 allows beam steering arrangements to be implemented by controlling the relative phases and magnitudes (amplitudes) of the radio-frequency signals conveyed by the radiators. Phase shifters 48 may adjust the relative phases and/or amplifiers 50 may adjust the relative magnitudes of the transmitted and received radio-frequency signals. The term "beam" or "signal beam" may be used herein to collectively refer to wireless signals that are transmitted and received by at least one radiator 30 in a particular direction. The beam exhibits a peak gain in a pointing direction (e.g., at a pointing angle) and some reduced gain away from the pointing direction (e.g., the beam may exhibit a beam width associated with the physical spread of the electromagnetic energy associated with the signals). The term "transmit beam" may sometimes be used herein to refer to a signal beam of transmitted radio-frequency signals whereas the term "receive beam" may sometimes be used herein to refer to a signal beam of received radio-frequency signals.

Phased antenna array 53 operates by concurrently transmitting or receiving radio-frequency signals using each radiator in the array while providing the signals for each radiator with predetermined phases and magnitudes. If, for example, phase shifters 48 and amplifiers 50 are adjusted to produce a first set of phases and magnitudes for transmitted radio-frequency signals, the signals transmitted by each radiator will constructively and destructively interfere during propagation to form a combined transmit beam that is oriented in direction 52. If, however, phase shifters 48 and amplifiers 50 are adjusted to produce a second set of phases and magnitudes for the transmitted radio-frequency signals, the signals transmitted by each radiator will constructively and destructively interfere to form a combined transmit beam that is oriented in direction 54. Similarly, if phase shifters 48 and amplifiers 50 are adjusted to produce the first set of phases and/or magnitudes, wireless signals may be received from direction 52. If phase shifters 48 and amplifiers 50 are adjusted to produce the second set of phases and magnitudes, signals may be received from direction 54. By adjusting the phase and magnitude of each transceiver chain 46-1, the relative phases and magnitudes of the signals transmitted (or received) by each radiator is changed to shift (steer) the direction of the beam of signals handled by phased antenna array 53. In this way, phased antenna array 53 may steer the signal beam over field of view 56 (e.g., to point towards a single external communication terminal).

Phased antenna arrays such as phased antenna array 53 of FIG. 4 require separate amplifiers 50, transceivers 28, and phase shifters 48 for each radiator 30 to point the signal beam in only a single direction at any given time. This may consume an excessive amount of power and space within communication terminal 10. These factors are particularly pronounced in scenarios where communication terminal 10 needs to communicate with multiple external communication terminals at once. In these scenarios, separate phased antenna arrays (e.g., phased antenna arrays each having M radiators, M phase shifters, M amplifiers, and M transceivers) may be required to maintain each wireless link with each external communication terminal. In order to reduce or minimize power and space consumption within communication terminal 10 while supporting multiple wireless communications links with satisfactory link quality, communication terminal 10 may be provided with wireless circuitry of the type shown in FIG. 5.

Figure 5:
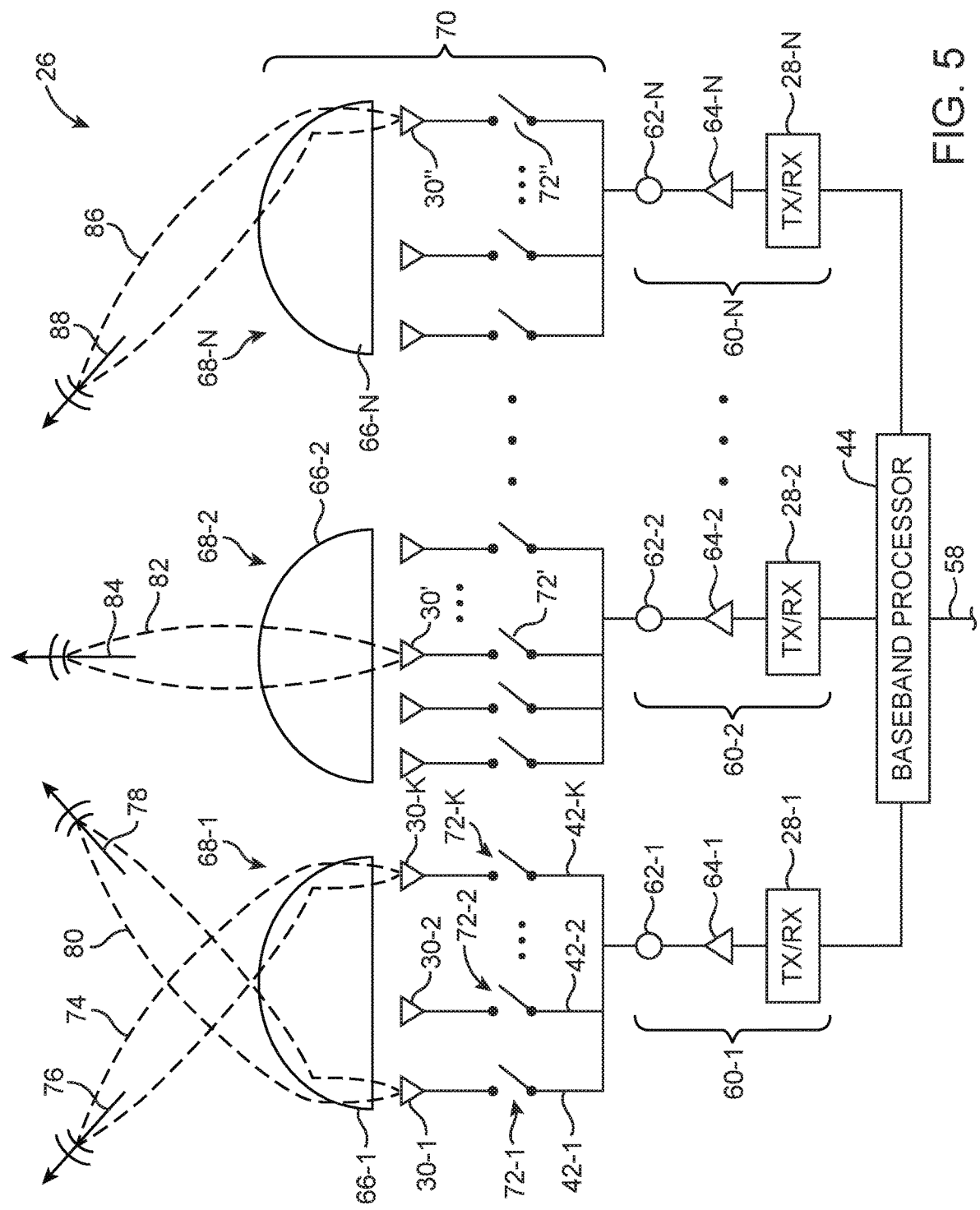
FIG. 5 is a diagram of illustrative antenna modules having corresponding lenses and radiators that may be selectively activated to direct radio-frequency signals in different directions in accordance with some embodiments.

As shown in FIG. 5, wireless circuitry 26 may include N antenna modules 68 (e.g., a first antenna module 68-1, a second antenna module 68-2, an Nth antenna module 68-N, etc.). Each antenna module 68 (sometimes referred to herein as tile 68, module tile 68, or module 68) may include K radiators 30 (e.g., a first radiator 30-1, a second radiator 30-2, a Kth radiator 30-K). The K radiators 30 in each module 68 may be coupled to a single corresponding (shared) one of N transceiver chains 60 (e.g., a first transceiver chain 60-1, a second transceiver chain 60-2, an Nth transceiver chain 60-N, etc.). For example, each radiator 30 in module 68-1 may be coupled to transceiver chain 60-1 over a corresponding transmission line 42 (e.g., radiator 30-1 may be coupled to chain 60-1 over transmission line 42-1, radiator 30-2 may be coupled to chain 60-1 over transmission line 42-2, radiator 30-K may be coupled to chain 60-1 over transmission line 42-K, etc.). Similarly, each radiator 30 in module 68-2 may be coupled to transceiver chain 60-2 and each radiator 30 in module 68-N may be coupled to transceiver chain 60-N.

Each transceiver chain 60 includes a corresponding transceiver 28, amplifier 64, and phase shifter 62 (e.g., chain 60-1 may include transceiver 28-1, amplifier 64-1, and phase shifter 62-1, chain 60-2 may include transceiver 28-2, amplifier 64-2, and phase shifter 62-2, chain 60-N may include transceiver 28-N, amplifier 64-N, and phase shifter 62-N, etc.). The transceiver 28 in each chain may be coupled to one or more baseband processors 44 (e.g., a single shared baseband processor 44 or multiple separate baseband processors 44). Baseband processor(s) 44 may be coupled to other circuitry such as applications processor circuitry (e.g., control circuitry 22 of FIG. 2) over data path 58. While the example of FIG. 5 only shows amplifiers 64 in a single direction (e.g., for transmitting signals) for the sake of clarity, in general, transceiver chains 60 may also include amplifiers 64 in an opposing direction (e.g., low noise amplifiers pointing towards transceivers 28 for receiving signals).

Amplifiers 64 of FIG. 5 may include both power amplifiers for amplifying transmitted signals and low noise amplifiers for amplifying received signals. Filter circuitry (not shown) may be interposed on chains 60 to separate transmitted and received signals if desired. In the example of FIG. 5, phase shifters 62 are shown as being coupled between amplifiers 64 and radiators 30. This is merely illustrative and, if desired, amplifiers 64 may be coupled between phase shifters 62 and radiators 30 or may be omitted. In scenarios where radiators 30 have multiple feed terminals (e.g., both feed terminals 40A and 40B of FIG. 3), each transceiver 28 may include a first port coupled to feed terminals 40A and a second port coupled to feed terminals 40B (e.g., over the same amplifier, phase shifter, and switching circuitry or over separate amplifiers, phase shifters, and switching circuitry).

Each radiator 30 in each module 68 is coupled to its transceiver chain 60 through a corresponding switch 72 (e.g., radiator 30-1 in module 68-1 may be coupled to chain 60-1 through switch 72-1, radiator 30-2 may be coupled to chain 60-1 through switch 72-2, radiator 30-K may be coupled to chain 60-1 through switch 72-K, etc.). While switches 72 are shown as separate components in FIG. 5, two or more of switches 72 may be formed from the same switching circuitry (e.g., a switch matrix or switching network of any desired switches arranged in any desired manner). Baseband processor(s) 44 or other control circuitry in communication terminal 10 (e.g., control circuitry 22 of FIG. 2) may provide control signals to control terminals on switches 72 that selectively turn the switches on or off.

When a given switch 72 is turned on (closed or activated), the associated radiator 30 is activated (enabled) by coupling the radiator 30 to the corresponding transceiver chain 60. The activated radiator 30 subsequently transmits radio-frequency signals provided by the corresponding transceiver 28 and/or provides received radio-frequency signals to the corresponding transceiver 28. When a given switch is turned off (opened or deactivated), the associated radiator 30 is deactivated (disabled) by decoupling the radiator 30 from transceiver chain 60.

Each antenna module 68 may include a corresponding radio-frequency lens structure such as dielectric lens 66. Dielectric lenses 66 may be placed over the radiators in each antenna module 68 for directing the radio-frequency signals conveyed by that module. For example, a first dielectric lens 66-1 may be placed over (e.g., overlapping or in alignment with) antenna module 68-1, a second dielectric lens 66-2 may be placed over antenna module 68-2, an Nth lens 66-N may be placed over antenna module 68-N, etc. Lenses 66 may have a dielectric constant and shape that serves to alter the impedance over each radiator 30 by different amounts in different directions (e.g., based on the geometry of lens 66 and the location of each radiator 30 relative to lens 66). This may serve to direct or shift the radio-frequency signals conveyed by each underlying radiator 30 in a different direction.

As shown in the example of FIG. 5, switches 72-1 and 72-K may be turned on to couple radiators 30-1 and 30-K to transceiver chain 60-1. Transceiver 28-1 provides the same radio-frequency signals (e.g., with the same phase as provided by phase shifter 62-1 and the same magnitude as provide by amplifier 64-1) to both radiators 30-1 and 30-K. Radiator 30-1 may generate a transmit beam 80. The local geometry of lens 66-1 over radiator 30-1 may serve to redirect beam 80 in direction 78. At the same time, radiator 30-K may generate transmit beam 74. The local geometry of lens 66-1 over radiator 30-K may serve to redirect beam 74 in direction 76. By selectively activating different radiators 30 in module 68-1, radio-frequency signals can be transmitted and received by module 68-1 in one or more desired directions (e.g., directions pointing towards other communications terminals). In other words, the signal beams conveyed by module 68-1 may be steered by selectively activating different radiators 30 rather than by independently adjusting the phase and magnitude of each radiator. Multiple radiators 30 in module 68-1 may be activated at once and each beam may concurrently support separate wireless communications links between transceiver 28-1 and different respective communication terminals (e.g., radiator 30-K may perform wireless communications with a first communication terminal in direction 76 using beam 74 while radiator 30-1 performs wireless communications with a second communication terminal in direction 78 using beam 80).

Similarly, independent wireless links may be established using the other antenna modules 68 in wireless circuitry 26. For example, switch 72' in module 68-2 may be turned on so that radiator 30' transmits radio-frequency signals generated by transceiver 28-2 over beam 82 in direction 84 (e.g., a boresight direction of module 68-2 and lens 66-2). At the same time, switch 72" in module 68-N may be turned on so that radiator 30" transmits radio-frequency signals generated by transceiver 28-N over beam 86 in direction 88. Similar operations may also be performed to receive wireless signals over corresponding beams pointed in different directions (e.g., to perform bi-directional communications using multiple radiators within each module and/or multiple modules with one or more external communications terminals).

In this way, each antenna module may be controlled to establish one or more concurrent wireless links using signal beams (e.g., spot beams) in one or more different directions (e.g., each antenna module may support up to twenty or more concurrently wireless links). Concurrent wireless links may be established within each antenna module and/or across antenna modules so that wireless circuitry 26 may concurrently communicate with any desired number of other communications terminals (e.g., two communication terminals, tens of communication terminals, twenty or more communication terminals, hundreds of communication terminals, thousands of communication terminals, etc.). The geometry of lenses 66 may allow the radio-frequency signals to be conveyed in different pointing directions with a sufficient gain to support wireless communications over the long distances associated with satellite communications networks.

In the arrangement of FIG. 4, each radiator is concurrently active and provided with an independent phase and magnitude to point a single beam in a desired direction. In contrast, in the arrangement of FIG. 5, the radiators 30 in each module 68 share the same transceiver chain 60 and are provided with the same phase and magnitude. Rather than using relative phases between each radiator to steer a single beam of signals, one or more radiators 30 are independently activated to produce a beam of signals in one or more desired directions (e.g., through a single corresponding lens 66). Sharing transceiver chains between each antenna module 68 in this way (e.g., rather than providing separate transceiver chains for each radiator) reduces the space and power required to operate wireless circuitry 26 relative to the arrangement of FIG. 4. By activating radiators within each antenna module and across antenna modules, wireless circuitry 26 may communicate with many other communications terminals at any given time with satisfactory link quality (e.g., tens of terminals, hundreds of terminals, etc.).

The N antenna modules 68 in wireless circuitry 26 may sometimes be collectively referred to herein as an array 70 of antenna modules 68. The radiators 30 within each module 68 may sometimes be referred to herein as sub-arrays of array 70. The antenna modules 68 in array 70 may be arranged in any desired pattern (e.g., a grid having rows and columns of modules or having other patterns of modules such as hexagonal patterns of modules). There may be any desired number N of modules 68 in array 70 (e.g., one module 68, two modules 68, three modules 68, four modules 68, more than four modules 68, eight modules 68, nine modules 68, sixteen modules 68, twenty-five modules 68, etc.). In general, the number N of modules 68 in array 70 may be less than or equal to the number M of radiators 30 in the arrangement of FIG. 4, thereby serving to reduce the overall power consumption by the transceiver chains in wireless circuitry 26 relative to the arrangement of FIG. 4. Each module 68 may include any desired number K of radiators 30 (e.g., one radiator 30, two radiators 30, three radiators 30, four radiators 30, nine radiators 30, twelve radiators 30, sixteen radiators 30, twenty-five radiators 30, sixty-four radiators 30, greater than four radiators 30, greater than sixty-four radiators 30, etc.). The radiators 30 in each module 68 may be arranged in any desired pattern (e.g., a rectangular grid of rows and columns, concentric rings, or other patterns).

Figure 6:
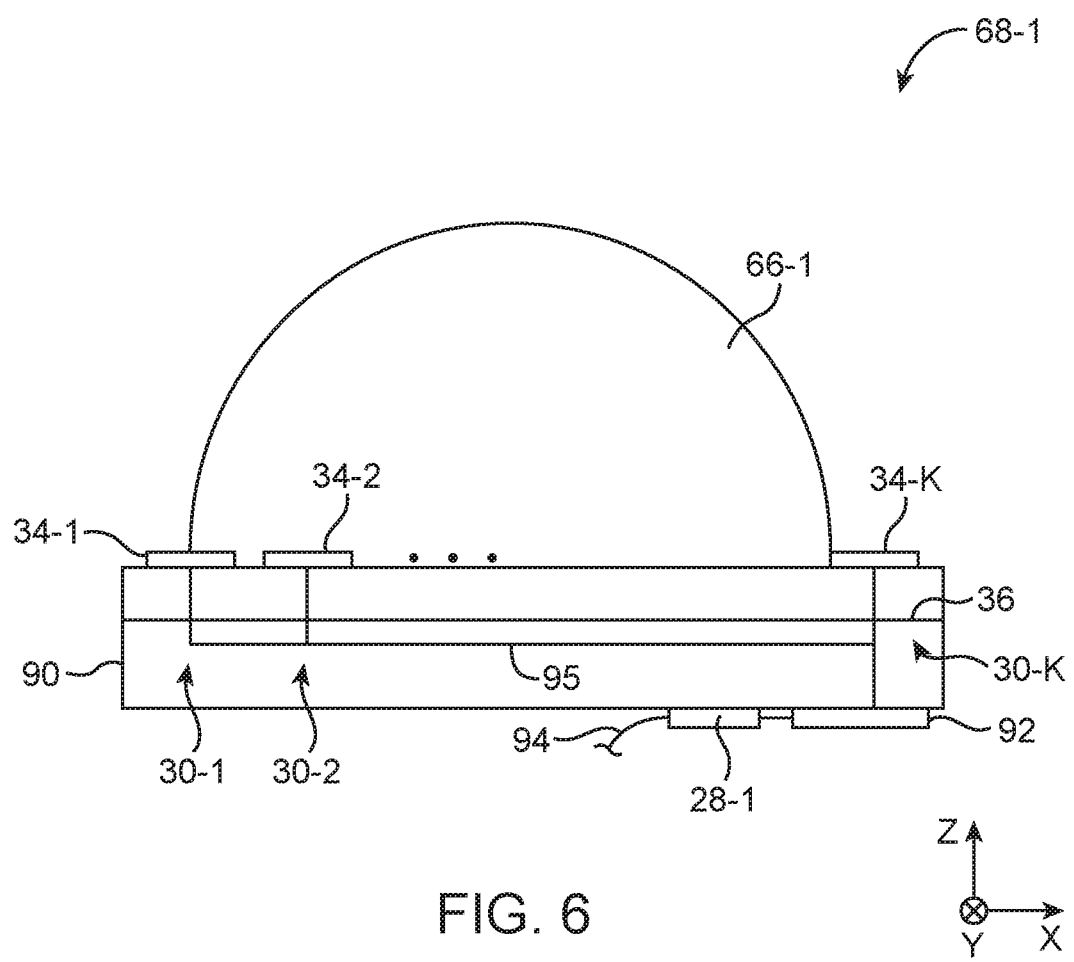
FIG. 6 is a cross-sectional side view of an illustrative antenna module having a lens and an array of radiators that may be selectively activated in accordance with some embodiments.

FIG. 6 is a cross-sectional side view of antenna module 68-1 in array 70. As shown in FIG. 6, antenna module 68-1 may include a substrate such as substrate 90. Substrate 90 may be a rigid printed circuit substrate, a flexible printed circuit substrate, ceramic, glass, plastic, or any other desired substrate. Ground plane 36 for each radiator 30 may be embedded within substrate 90 (e.g., on one or more layers of substrate 90). Patch elements 34 of each radiator 30 may be located at the upper surface of substrate 90 and may be coupled to switching circuitry 92 mounted to the lower surface of substrate 90 over transmission line traces 95. Transmission line traces 95 may be used in forming transmission lines 42 (FIG. 5) and may include stripline transmission line structures, microstrip transmission line structures, waveguide transmission line structures, conductive through vias extending through substrate 90, conductive traces on one or more layers of substrate 90, etc. Switching circuitry 92 may include surface mount components or other components used to implement the K switches 72 of FIG. 5. As shown in FIG. 6, transceiver 28-1 may also be mounted to the lower surface of substrate 90 (e.g., as a radio-frequency integrated circuit) and may be coupled to switching circuitry 92 over conductive traces or other transmission line structures on substrate 90. Phase shifter 62-1 and amplifier 64-1 (FIG. 5) may be integrated within the integrated circuit used to form transceiver 28-1, if desired. Transceiver 28-1 may be coupled to baseband processor(s) 44 of FIG. 5 over baseband path 94.

As shown in FIG. 6, lens 66-1 of antenna module 68-1 may be mounted to the upper surface of substrate 90 over patch elements 34. Lens 66-1 may completely overlap each of the K patch elements 34, may partially overlap some of the patch elements (e.g., patch element 34-1 as shown in FIG. 6), and/or may not overlap some of the patch elements (e.g., patch element 34-K as shown in FIG. 6). Lens 66-1 may be affixed to substrate 90 using any desired attachment structures (e.g., a layer of adhesive, screws, pins, clips, brackets, etc.). Lens 66-1 may serve to direct the beam of signals for each radiator 30 in module 68-1 in a different respective direction. In the example of FIG. 6, lens 66-1 has a hemispheric shape. This is merely illustrative. In general, lens 66-1 may have any other desired shape having curved and/or flat sides (e.g., lens 66-1 may have an aspherical shape, a freeform shape, a spherical shape, a conical shape, a cylindrical shape, combinations of these, etc.). Likewise, the lens may have a uniform effective dielectric constant throughout its structure or may have a spatially varying dielectric constant. Using a spatially varying dielectric constant may, for example, allow the lens to have a flat shape. As an example, a flat lens may be formed using multiple materials having varying base dielectric constants or by mixing two or more materials (e.g., air and plastic) while varying their ratios. Similar structures may be used to form the other antenna modules 68 in array 70.

Figure 7:
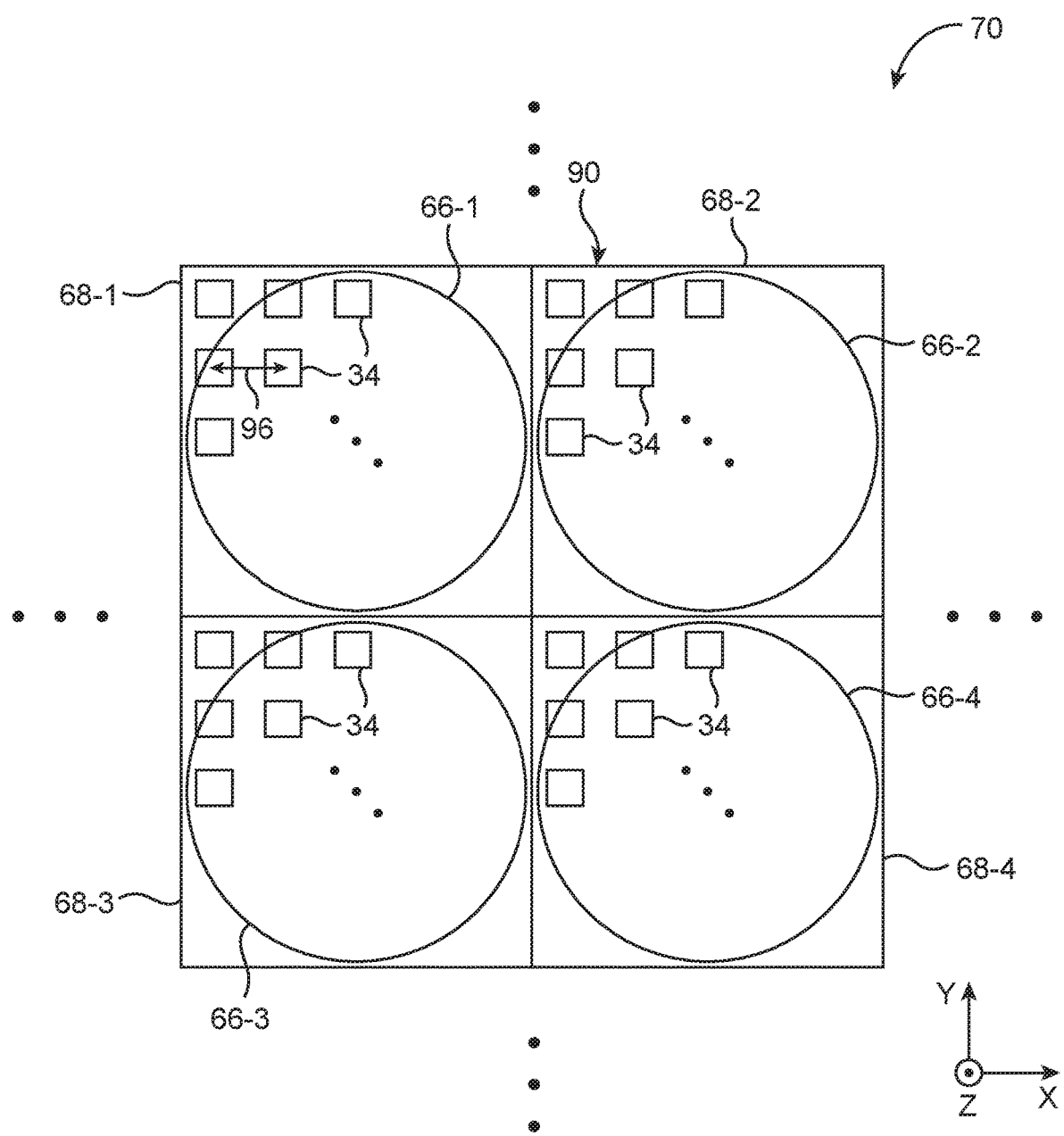
FIG. 7 is a top-down view of an illustrative array of antenna modules each having corresponding lenses and rectangular arrays of radiators in accordance with some embodiments.

FIG. 7 is a top-down view showing one example of how antenna modules 68 may be arranged in array 70. As shown in FIG. 7, array 70 may include four or more modules 68 (e.g., modules 68-1, 68-2, 68-3, and 68-4) that each include a corresponding array of patch elements 34 (radiators 30) and a corresponding lens 66. Each module 68 in array 70 may be provided with the same number of patch elements and the same lens 66 or two or more of modules 68 in array 70 may be provided with a different number or arrangement of patch elements and/or different lenses 66 (e.g., lenses 66 having different shapes). Varying the orientation and position of patch elements 34 across array 70 and/or varying the location of lenses 66 relative to the underlying elements 34 across array 70 may, for example, serve to reduce side lobe gain for the signals conveyed by array 70.

The patch elements 34 in each module 68 may be separated from adjacent patch elements 34 by at least distance 96. In phased antenna arrays such as phased antenna array 53 of FIG. 4, each patch element needs to be separated by a lattice spacing of no more than about one-half of the wavelength of operation (e.g., approximately 12 mm for $K_u$ band frequencies or approximately 6 mm for $K_a$ band frequencies). This leaves relatively little space between patch elements to integrate patch elements for covering other frequencies. However, the patch elements 34 in antenna modules 68 need not be located as close together (e.g., because the patch elements 34 in each module are all provided with signals having the same phase and magnitude and steering is performed by simply activating each radiator and directing the signals using lens 66). In other words, distance 96 may be greater than or equal to one-half of the wavelength of operation of module 68 (e.g., greater than 6 mm, greater than 12 mm, etc.). This may, for example, allow sufficient space between adjacent patch elements 34 on module 68 for covering a first frequency band to accommodate additional radiators for covering a second frequency band.

Figure 8:
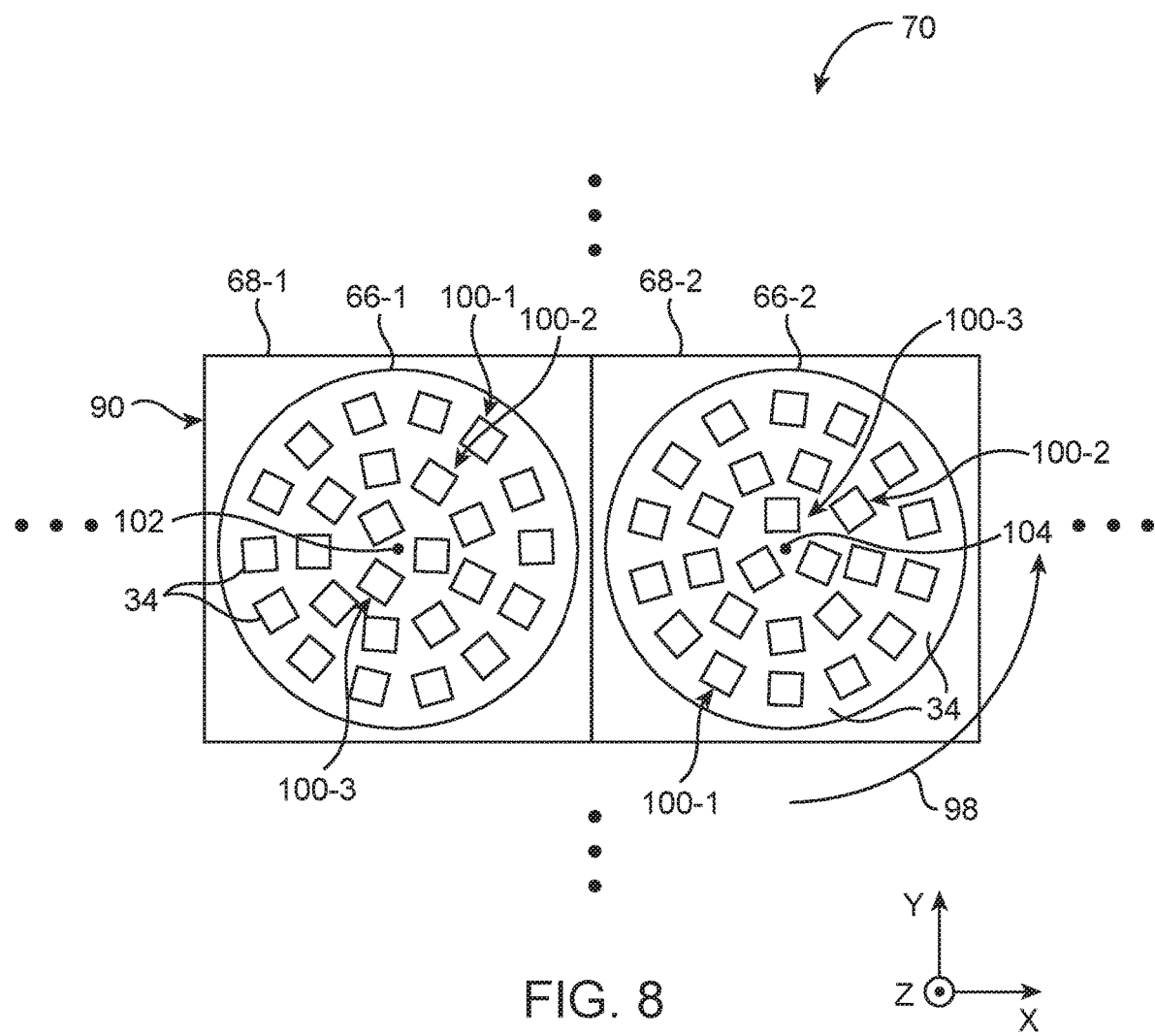
FIG. 8 is a top-down view of an illustrative array of antenna modules each having corresponding lenses and circular arrays of radiators in accordance with some embodiments.

In the example of FIG. 7, patch elements 34 in each module 68 are arranged in a rectangular grid of rows and columns. This is merely illustrative. In practice, lenses 66 may exhibit circular symmetry (e.g., to accommodate circular polarizations handled by patch elements 34). The arrangement of patch elements 34 need not have the same symmetry. To break that symmetry, a Cartesian grid of patch elements may be defined for a given module, which is then rotated in-plane by an angle other than 90 degrees in subsequent neighboring modules 68. In another suitable arrangement, patch elements 34 may be arranged in a pattern of concentric rings. If an antenna module is designed with patch elements arranged in concentric rings such that when the module is rotated by 90, 180, and 270 degrees the patches are all located in different positions relative to the axis of rotation, a diversity of patch element positions may result. The lens, in this example, is assumed to be centered over the axis of rotation, and thus there is an increase in number of relative patch positions. This in turn improves aggregate scan performance by introducing diversity into scanning locations at the individual module level. It prevents side lobes from each individual module from summing across the modules as the modules are arrayed and rotated. In one suitable arrangement, array 70 may include four identical modules each rotated at one of these four distinct angles (e.g., 0, 90, 180, and 270 degrees). This may, for example, allow the array to exhibit more robust polarization performance (e.g., circular polarization performance) than in scenarios where all of the patch elements have the same orientation across the array. FIG. 8 is a top-down view showing how array 70 may include modules 68 that have patch elements 34 arranged in a pattern of concentric rings and that are rotated with respect to each other across the array.

As shown in FIG. 8, array 70 may include antenna modules such as modules 68-1 and 68-2. Modules 68-1 and 68-2 may each include patch elements 34 arranged in one or more concentric rings 100 centered about a central axis (e.g., an axis extending parallel to the Z-axis of FIG. 8). In the example of FIG. 8, module 68-1 includes patch elements 34 arranged in first, second, and third concentric rings 100-1, 100-2, and 100-3 about axis 102 whereas module 68-2 includes first, second, and third concentric rings 100-1, 100-2, and 100-3 of patch elements 34 centered about axis 104. Each ring may include any desired number of patch elements 34 (e.g., rings that are located farther from the central axis may include more patch elements than rings closer to the central axis). Arranging patch elements 34 in circular rings may, for example, allow the patch elements to exhibit circular symmetry similar to that of lenses 66.

If desired, the patch elements 34 in module 68-2 (e.g., rings 100-1, 100-2, and 100-3 in module 68-2) may be rotated at a predetermined angle (e.g., 30 degrees, 45 degrees, 90 degrees, 60 degrees, 120 degrees, etc.) with respect to the corresponding patch elements 34 (rings 100) in module 68-1, as shown by arrow 98. As an example, each patch element 34 in ring 100-2 of module 68-1 may be placed at 0 degrees, 45 degrees, 90 degrees, etc. relative to the X-axis about central axis 102, whereas each patch element 34 in ring 100-2 of module 68-2 may be placed at 30 degrees, 75 degrees, 120 degrees, etc. relative to the X-axis. Orienting the patch elements 34 in adjacent modules 68 in this way may, for example, create more scan positions in the global coordinate system relative to scenarios where the patch elements 34 in each module 68 are arranged in the same orientation, while also allowing each antenna module 68 to be fabricated using the same fabrication processes. In the example of FIG. 8, lenses 66 are centered about axes 102 on modules 68. In another suitable arrangement, lenses 66 may be offset with respect to the center of the underlying module 68 by different amounts across array 70 to introduce positional diversity across the array. In yet another suitable arrangement, each patch element 34 may be sequentially rotated (e.g., by 90 degrees) with respect to the other patch elements 34 within the same module 68. This may, for example, optimize performance while reducing side lobes in scenarios where patch elements 34 are driven using circularly polarized signals.

Figure 9:
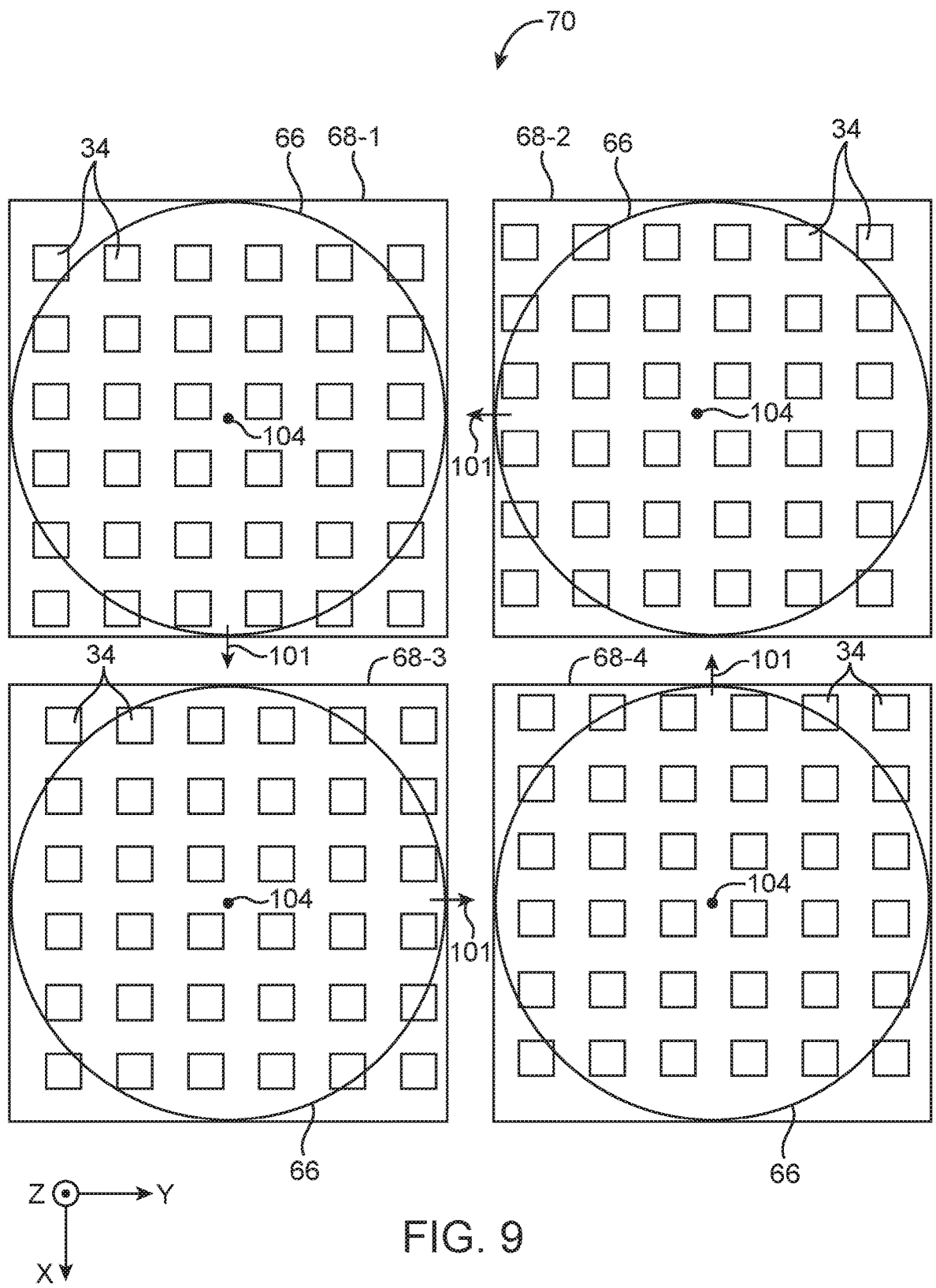
FIG. 9 is a top-down view of an illustrative array of antenna modules that are rotated with respect to each other in accordance with some embodiments.

FIG. 9 is a top-down view showing an example of how four modules 68 in array 70 may be formed using the same structures (e.g., using the same lenses and radiators) but may be oriented at different angles with respect to each other. As shown in FIG. 9, array 70 may include modules 68-1, 68-2, 68-3 and 68-4. Each of these modules may be provided with the same pattern of patch elements 34 and lenses 66. However, module 68-2 may be rotated at a non-zero angle with respect to module 68-1, module 68-3 may be rotated at a non-zero angle with respect to modules 68-1 and 68-2, and module 68-4 may be rotated at a non-zero angle with respect to modules 68-1, 68-2, and 68-3. Arrows 101 illustrate the relative orientations of modules 68-1, 68-2, 68-3, and 68-4 in FIG. 9. For example, module 68-1 may be rotated at 0 degrees with respect to the X-axis, module 68-2 may be rotated at 90 degrees with respect to the X-axis, module 68-3 may be rotated at 270 degrees with respect to the X-axis, and module 68-4 may be rotated at 180 degrees with respect to the X-axis.

This may, for example, provide array 70 with a diversity of patch element positions. This may serve to improve aggregate scan performance by introducing diversity into scanning locations at the individual module level. It also allows prevents side lobes from each individual module from summing across the modules as the modules are arrayed and rotated. This may, for example, allow for array 70 to exhibit more robust polarization performance (e.g., circular polarization performance) than in scenarios where all of the patch elements have the same orientation across the array. If desired, each of antenna modules 68-1, 68-2, 68-3, and 68-4 may be provided with radio-frequency signals (e.g., from the corresponding transceiver chains) that have been offset in phase based on the orientation (rotation angle) of the module and the distances between the modules (e.g., beam steering performed across array 70 may involve providing different phase offsets to each of modules 68-1, 68-2, 68-3, and 68-4 to compensate for their respective orientations and separations, in addition to phasing the modules to steer a signal beam in a particular direction). The example of FIG. 9 is merely illustrative. Patch elements 34 in modules 68-1, 68-2, 68-3, and 68-4 may be arranged in other patterns (e.g., concentric rings, non-rectangular patterns, etc.).

Figure 10:
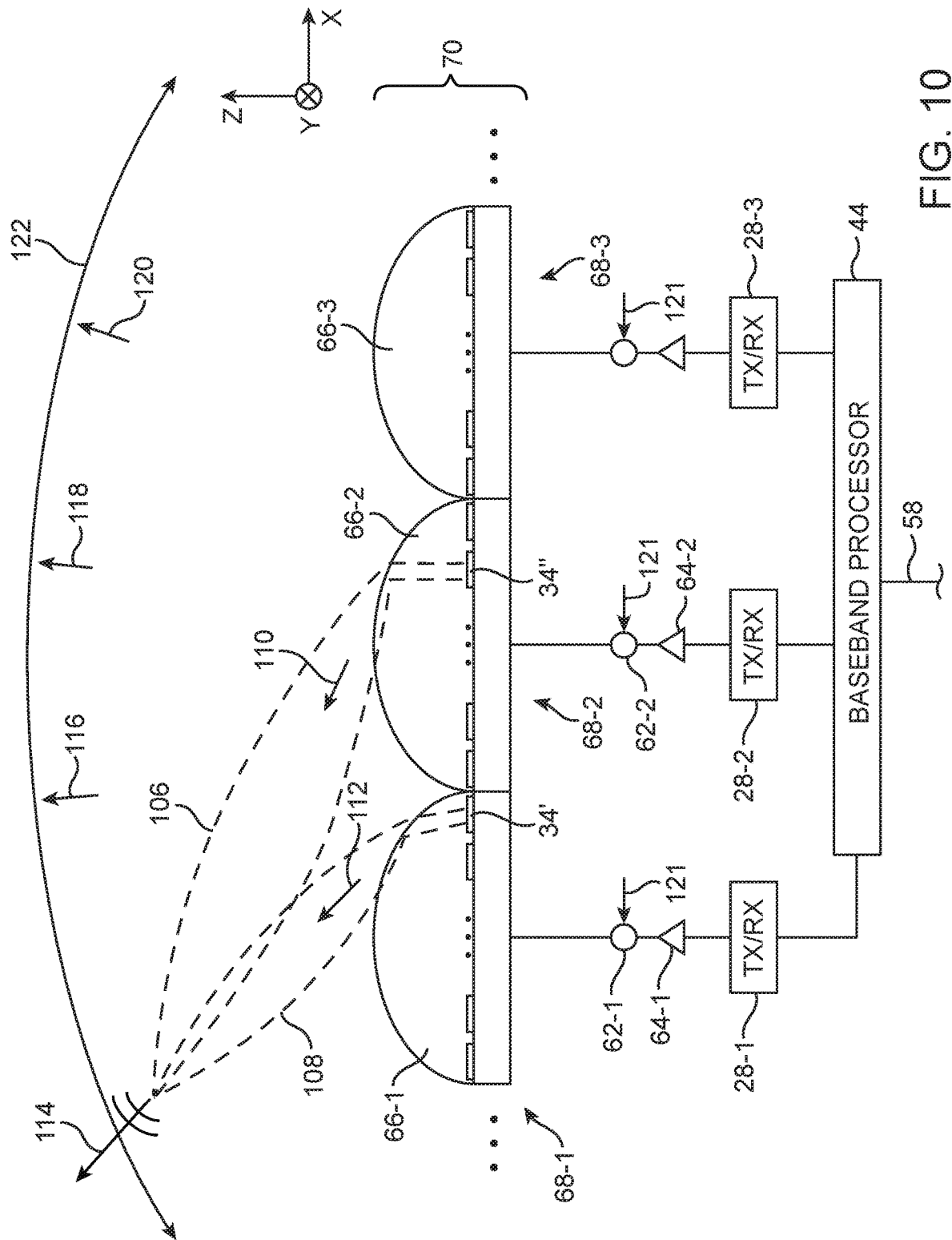
FIG. 10 is a diagram showing how an illustrative array of antenna modules may be controlled to form a phased array of antenna modules in accordance with some embodiments.

If desired, the relative phases and magnitudes provided to each antenna module 68 (e.g., by the corresponding transceiver chain 60) may be adjusted to perform beam steering across the array 70 (e.g., where each module 68 is independently controlled (phased) like a corresponding radiator 30 in the phased antenna array 53 of FIG. 4). FIG. 10 is a diagram showing how each antenna module 68 may be controlled to perform beam steering across array 70.

As shown in FIG. 10, when patch element 34' is activated (e.g., using switches 72 shown in FIG. 5), patch element 34' and lens 66-1 in module 68-1 may produce a signal beam 108 in direction 112. When patch element 34" is activated, patch element 34" and lens 66-2 may produce a signal beam 106 in direction 110. Baseband processor(s) 44 and/or other control circuitry 22 (FIG. 2) may adjust the phases provided by phase shifters 62-1 and 62-2 (e.g., using control signal 121) and/or may adjust the magnitudes provided by amplifiers 64-1 and 64-2 so that beams 108 and 106 constructively and destructively interfere to produce a combined signal beam pointing in direction 114 (e.g., a direction that is the same as directions 112 and/or 110 or that is different than directions 112 and 110). By adjusting the relative phase and magnitude between modules 68, the combined beam produced by signals from multiple modules 68 may be steered in any desired directions. In other words, array 70 of modules 68 may be operated as a phased array of modules 68. Array 70 may therefore sometimes be referred to herein as phased array antenna 70, antenna 70, or scanning antenna 70. In general, different combinations of patch elements 34 may be concurrently activated while phase and magnitude are adjusted for each module 68 to produce one or more combined beams (e.g., satellite spot beams) pointing in any desired directions across field of view 122 of array 70 (e.g., directions 116, 118, 120, etc.).

The combined beam may, for example, be used to point beams in directions that are not otherwise pointed to directly by individual radiators 30 (individual patch elements 34) or to increase the gain of array 70 in a particular direction. For example, beams 108 and 106 of FIG. 10 may each exhibit individual gains of up to 18 dB. In some scenarios, an external communication terminal may require a wireless link with a link budget of 20 dB or higher (e.g., 33 dB). The beam from an individual patch element 34 may not offer sufficient gain to support such a wireless link. However, two or more separate beams from two or more modules 68 may be generated in the same direction (e.g., by activating appropriate patch elements 34 in each module) to produce a combined beam in the direction of the external communication module that exhibits a total gain that meets the required link budget (e.g., the combined beam may be produced at a gain of 33 dB or greater in a scenario where radiators from 32 modules contribute to the combined beam). In this way, each lens 66 may be provided with signals of different phases and magnitudes to point one or more beams of signals in any desired directions with any desired gain (e.g., to meet link budget requirements associated with different external communication terminals).

Figure 11:
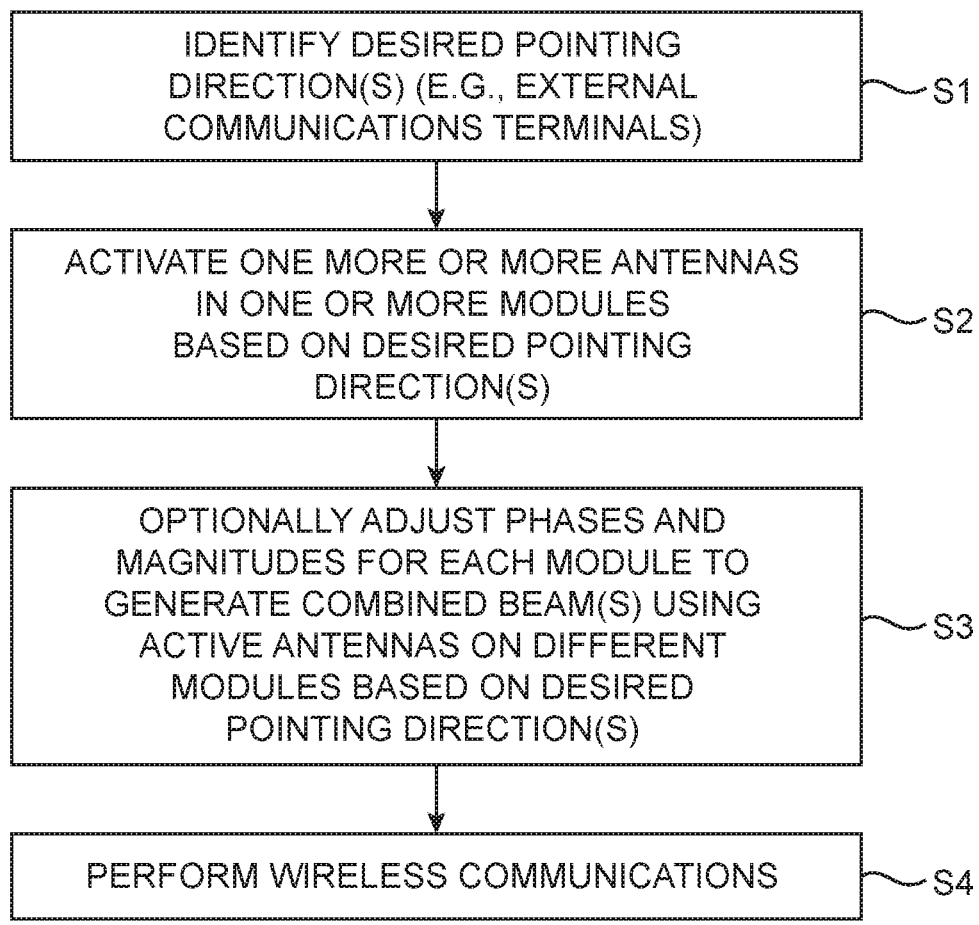
FIG. 11 is a flow chart of illustrative steps involved in operating a phased array of antenna modules of the type shown in FIG. 10 in accordance with some embodiments.

FIG. 11 is a flow chart of illustrative steps that may be performed in operating array 70 of FIG. 10 as a phased array of antenna modules. At step S1, control circuitry 22 (FIG. 2) may identify desired pointing directions for communications (e.g., directions towards external communication terminals).

At step S2, control circuitry 22 may control switches 72 (FIG. 5) to selectively activate one or more radiators 30 in one or more antenna modules 68 across array 70 based on the identified pointing directions. For example, radiators 30 that produce signal beams in the identified pointing directions may be activated.

At optional step S3, control circuitry 22 may adjust the phases and magnitudes for each module 68 to generate one or more combined beams using signals from two or more modules 68 based on the desired pointing directions. The combined beams may, for example, be produced in one or more of the identified pointing directions. Control circuitry 22 may, for example, perform step S3 in scenarios where individual radiators 30 are not capable of covering the desired pointing direction with sufficient gain. Control circuitry 22 may, for example, control array 70 so that different beams pointing in approximately the same direction from two or more antenna modules (e.g., three antenna modules, four antenna modules, sixteen antenna modules, more than sixteen antenna modules, etc.) are combined to produce a combined beam with a sufficient gain in one of the predetermined directions (e.g., to meet a link budget requirement associated with an external communication terminal at the predetermined direction). Step S3 may be omitted if desired.

At step S4, wireless circuitry 26 may perform wireless communications over the signal beams generated by individually activated radiators 30 and/or over combined signal beams generated by multiple activated radiators 30 across two or more modules 68 (e.g., over corresponding wireless links such as links 14, 18, 16, and 20 of FIG. 1). The example of FIG. 11 is merely illustrative. The steps of FIG. 11 may be performed in other orders (e.g., step S3 may be performed prior to or concurrently with step S2). If desired, control circuitry 22 may sweep through different beams (e.g., by activating individual radiators 30 and/or by adjusting phases across modules) until a communications link with an external communication terminal is found and/or established.

Figure 12:
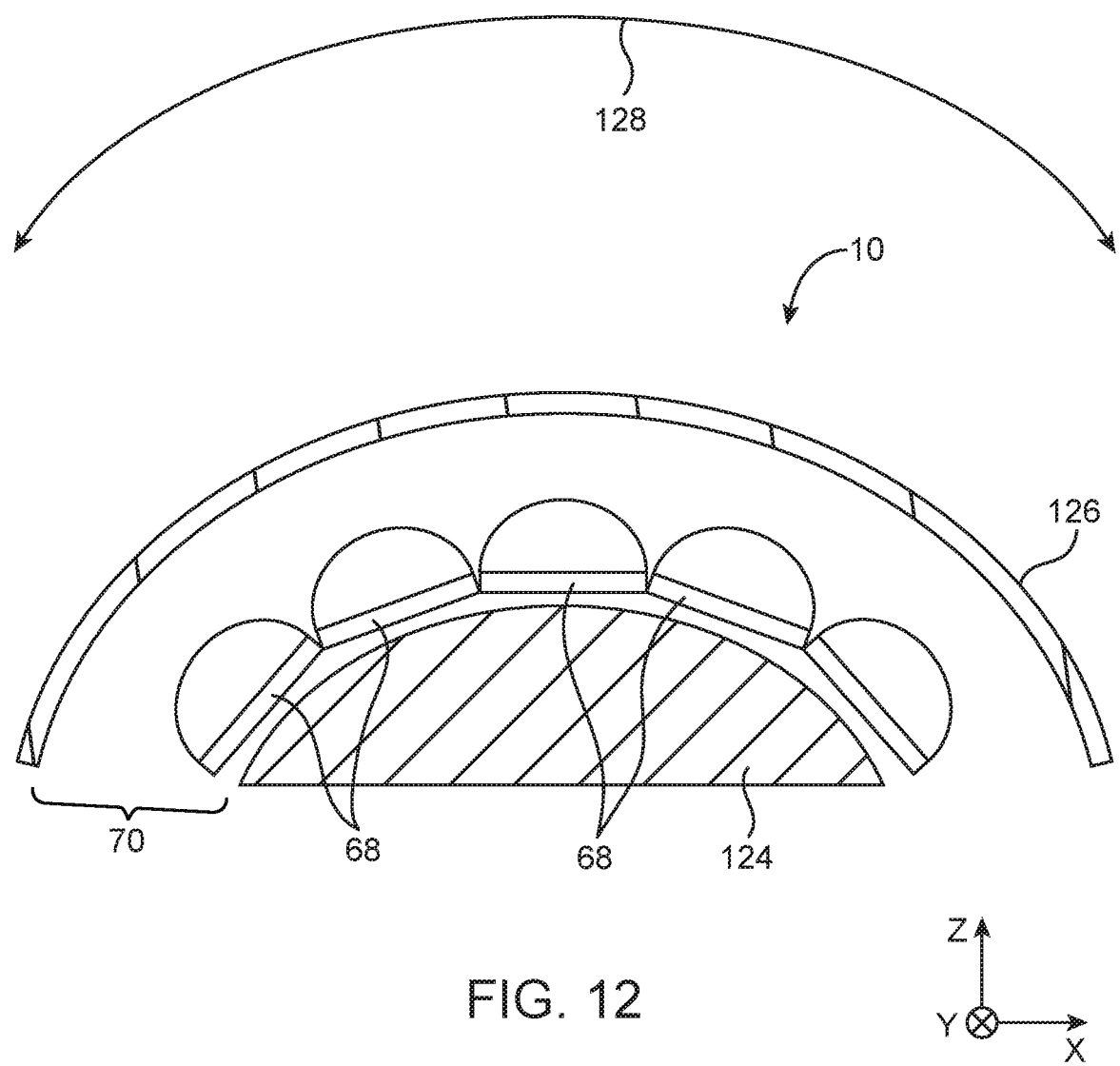
FIG. 12 is a side-view of an illustrative array of antenna modules that has been arranged in a curved configuration to increase system scan range in accordance with some embodiments.

Forming array 70 using modular structures such as antenna modules 68 may allow array 70 to be arranged in a non-planar shape if desired. FIG. 12 is a side-view showing how array 70 of modules 68 may be provided with a non-planar shape. As shown in FIG. 12, array 70 may be curved around the Y-axis of FIG. 12 (e.g., so that each module 68 faces a different direction). This may allow array 70 to fit within terminal 10 while accommodating other components such as curved components 124 and/or 126 (e.g., a curved housing, etc.). This may also serve to expand the field of view 128 of array 70 relative to scenarios where array 70 is planar, for example. The example of FIG. 12 is merely illustrative. In general, array 70 may have any desired shape. Array 70 may be curved around multiple axes (e.g., around both the X and Y axes of FIG. 12) to form a surface of any desired shape.

Figure 13:
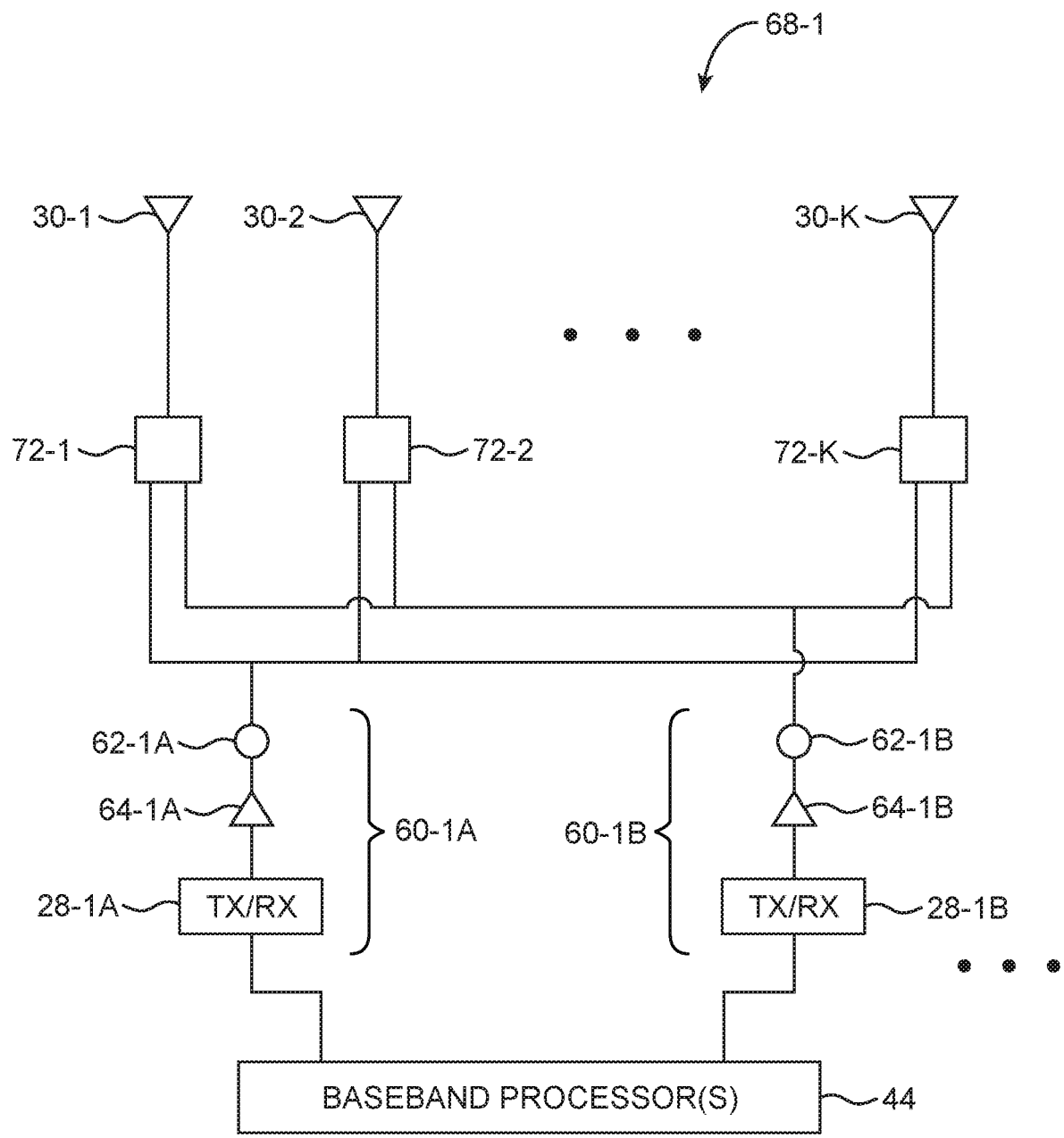
FIG. 13 is a diagram of an illustrative antenna module having radiators coupled to different transceiver chains for conveying radio-frequency signals at different frequencies in accordance with some embodiments.

If desired, radiators 30 in each module 68 may be used to cover multiple different frequency bands. FIG. 13 is a diagram of an illustrative module 68-1 that may be used to cover multiple different frequency bands. As shown in FIG. 13, antenna module 68-1 may include different transceiver chains 60-1 that each cover a respective frequency band (e.g., antenna module 68-1 may include transceiver chain 60-1A that covers a first frequency band A and transceiver chain 60-1B that covers a second frequency band B). In one suitable arrangement, frequency band A may be a $K_a$ frequency band whereas frequency band B may be a $K_u$ frequency band. Any other bands may be used if desired.

As shown in FIG. 13, transceiver chain 60-1A includes a corresponding transceiver 28-1A, amplifier 64-1A, and phase shifter 62-1A coupled to each of the K switches 72 of module 68-1. Similarly, transceiver chain 60-1B includes a corresponding transceiver 28-1B, amplifier 64-1B, and phase shifter 62-1B coupled to each of the K switches 72 in module 68-1. Each switch 72 may be controlled to selectively couple each radiator 30 to a selected one of transceiver chains 60-1A and 60-1B at any given time (or to decouple radiator 30 from both chains when that radiator is inactive). This may allow each radiator 30 to convey radio-frequency signals in either frequency band A (e.g., the $K_a$ band) or frequency band B (e.g., the $K_u$ band) in its corresponding pointing direction at any given time. The band covered by each radiator may be changed over time using switches 72. Each module 68 may include respective transceiver chains such as chains 60-1A and 60-1B of FIG. 13 for covering different frequency bands (e.g., each module 68 may include a single chain shared by each of the radiators per frequency band).

The example of FIG. 13 is merely illustrative. In general, module 68-1 may include any desired number of transceiver chains 60-1 coupled to switches 72 (e.g., one transceiver chain per frequency band or per wireless data stream). The example of FIG. 13 assumes that radiators 30 exhibit sufficient bandwidth to cover each frequency band. In another suitable arrangement, each module 68 may include different radiators for covering different frequency bands.

Figure 14:
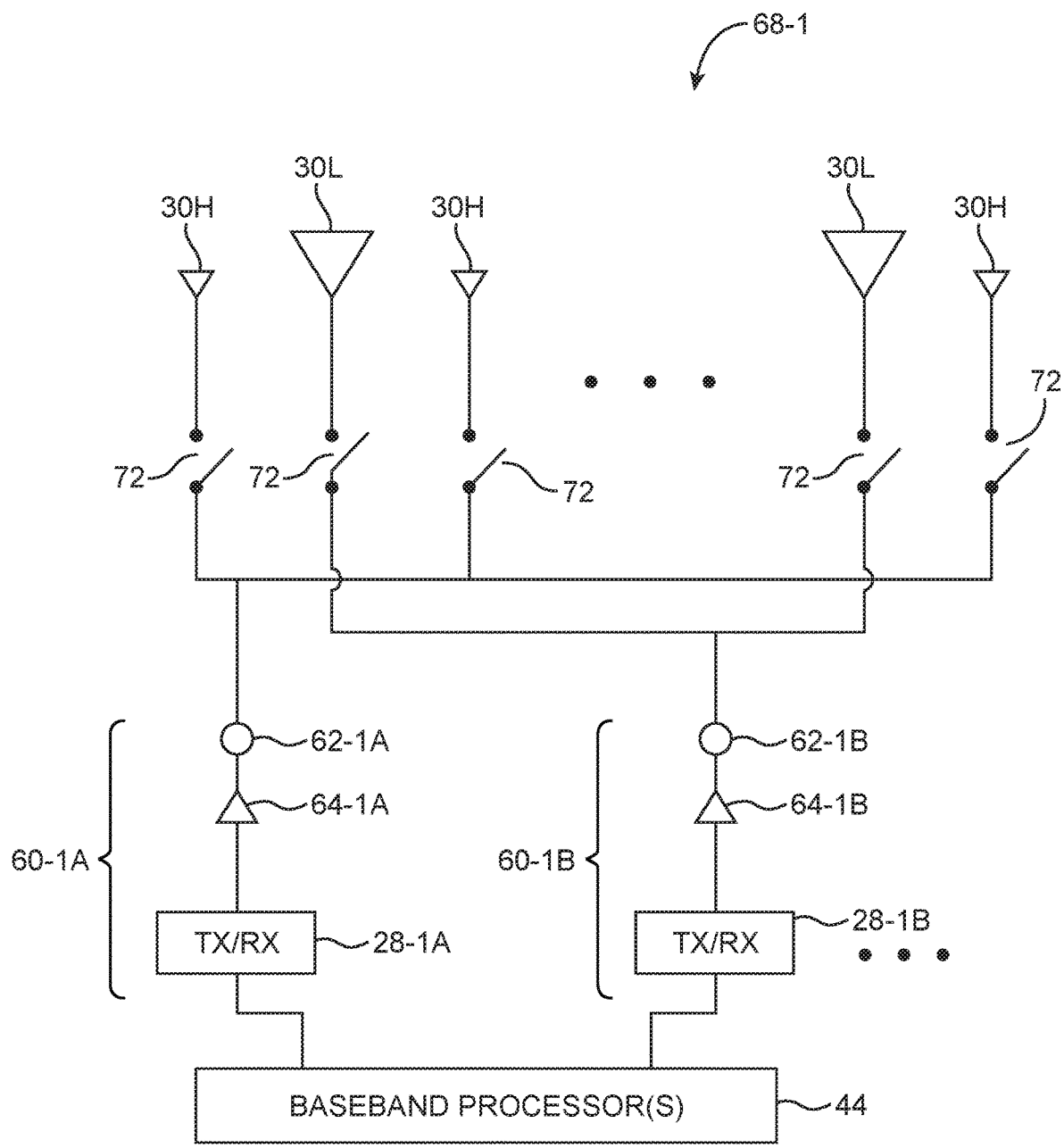
FIG. 14 is a diagram of an illustrative antenna module having a first set of radiators that convey radio-frequency signals at a first frequency and a second set of radiators that convey radio-frequency signals at a second frequency in accordance with some embodiments.

FIG. 14 is a diagram showing how module 68-1 may include different radiators for covering different frequency bands. As shown in FIG. 14, module 68-1 may include a first set of radiators 30H for covering frequency band A and a second set of radiators 30L for covering frequency band B. Each radiator 30H may be coupled to transceiver chain 60-1A over corresponding switches 72. Each radiator 30L may be coupled to transceiver 60-1B over corresponding switches 72. Switches 72 may be selectively activated to provide beams of signals in frequency band A or frequency band B in different directions. Forming radiators 30H and 30L as separate radiators may allow each radiator to be optimized for each frequency band. Radiators 30H may be interspersed among radiators 30L in module 68-1 to allow radiators 30H and 30L to cover similar pointing angles. The other modules 68 in array 70 may also include radiators such as radiators 30H and 30L for covering different frequency bands. The example of FIG. 14 is merely illustrative. In general, module 68-1 may include any desired number of transceiver chains 60-1 and sets of radiators 30 for covering any desired number of frequency bands.

Figure 15:
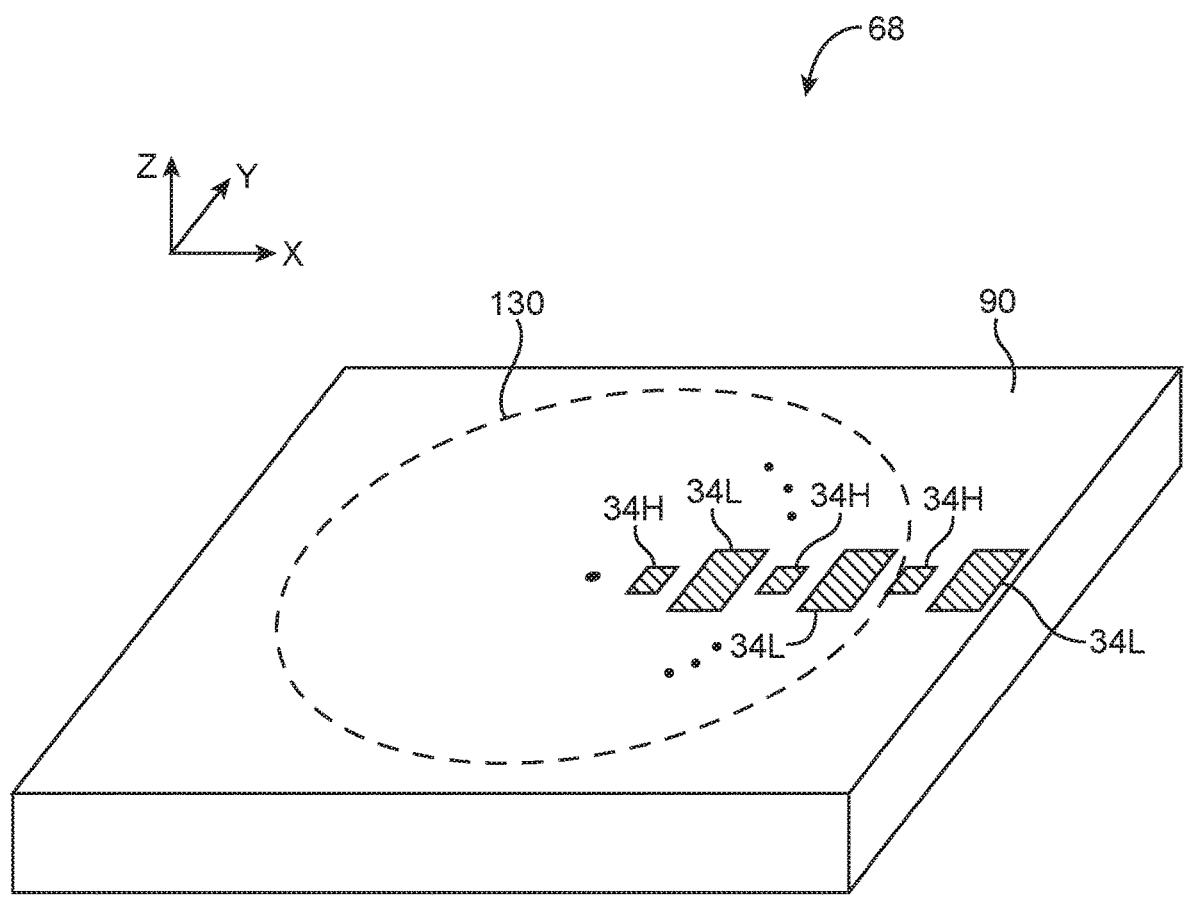
FIG. 15 is a perspective view of an illustrative antenna module having first and second sets of radiators for covering respective first and second frequencies in accordance with some embodiments.

FIG. 15 is a perspective view of a given antenna module 68 provided with different sets of radiators for covering different frequency bands. As shown in FIG. 15, a first set of patch elements 34H (e.g., patch elements 34H in radiators 30H of FIG. 14) and a second set of patch elements 34L (e.g., patch elements 34L in radiators 30L of FIG. 14) may be mounted to substrate 90. Patch elements 34H may be interleaved among patch elements 34L so that both frequencies may cover similar pointing angles. Patch elements 34H and 34L as shown in FIG. 15 may be repeated to provide module 68 with a rectangular pattern of patch elements (e.g., as shown in FIG. 7) or with concentric circular rings of patch elements (e.g., as shown in FIG. 8). Lens 66 of module 68 has been omitted from FIG. 15 for the sake of clarity. However, lens 66 may have a lateral outline 130 on the top surface of substrate 90. Lateral outline 130 may surround each patch element or, as shown in the example of FIG. 15, at least one element 34H and at least one element 34L may lie outside of outline 130.

Operating modules 68 with multiple frequency bands (e.g., using the arrangements of FIGS. 13-15) may allow wireless circuitry 26 to support a greater data throughput per antenna volume relative to flat panel phased antenna arrays (e.g., scenarios where phased antenna array 53 of FIG. 4 is used). Data throughput may be further increased using multiple different polarizations (e.g., by coupling separate ports on each transceiver 28 for to different feed terminals on each radiator such as feed terminals 40A and 40B of FIG. 3). Signal beams at multiple different frequencies and/or polarizations may be generated in approximately the same pointing direction using multiple different modules 68 to further increase data throughput with a particular external communication terminal at that pointing direction. Beam steering between modules 68 at one or more frequencies may be performed if desired (e.g., as described in connection with FIGS. 10 and 11). In this way, communication terminal 10 may exhibit data throughputs that are up to or at least ten times the data throughput associated with phased antenna array 53 of FIG. 4, while also reducing space consumption, power consumption, and manufacturing cost (e.g., while maintaining multiple wireless links with satisfactory link quality over a wide field of view). The example of FIGS. 6-10 and 15 in which radiators 30 include patch elements 34 is merely illustrative. In general, radiators 30 may be formed using any desired antenna structures (e.g., any desired antenna radiating elements having any desired shapes and feeding arrangements). The examples of FIGS. 5-15 in which lenses 66 are shown as having a hemispherical shape are merely illustrative. The shape of lenses 66 in array 70 may be selected to optimize gain for each separately-activated underlying radiator 30 across a desired field of view.

In accordance with some embodiments, a method may be provided as substantially described herein with reference to each or any combination of the Figures contained herein, with reference to each or any techniques disclosed herein, or with reference to each or any combination of Figures and/or techniques disclosed herein.

In accordance with some embodiments, a device may be configured to perform any action or combination of actions as substantially described in the disclosures set forth herein.

In accordance with some embodiments, a device may include any component or combination of components as described herein and performs any of the functions and/or operations disclosed herein.

In accordance with some embodiments, a non-volatile computer-readable medium may store instructions that, when executed, cause processor electronics to perform any action or combination of actions as substantially described herein.

The foregoing is merely illustrative and various modifications can be made to the described embodiments. The foregoing embodiments may be implemented individually or in any combination.

What is claimed is:

1. A communication terminal comprising:
a first array of radiators; and
a second array of radiators that is laterally offset from the first array of radiators, wherein the radiators in the first array are arranged in a two-dimensional rectangular pattern and the radiators in the second array are arranged in a two-dimensional rectangular pattern that is oriented at a non-zero angle with respect to the two-dimensional rectangular pattern of the first array.

2. A communication terminal comprising:
a first array of radiators arranged in a pattern of concentric rings; and
a second array of radiators that is laterally offset from the first array and that is arranged in a pattern of concentric rings that is rotated at a non-zero angle with respect to the pattern of concentric rings in the first array.

3. A communication terminal comprising:
a first array of radiators on a first substrate having a first lateral surface, a first lens overlapping the first array of radiators and mounted to the first lateral surface;
a second array of radiators on a second substrate having a second lateral surface, a second lens overlapping the second array of radiators and mounted to the second lateral surface;
a component; and
a curved housing, wherein the first substrate and the second substrate are disposed between the component and the curved housing, and the second lateral surface is non-parallel with respect to the first lateral surface.

4. The communication terminal of claim 1, wherein the non-zero angle is ninety degrees.

5. The communication terminal of claim 1, wherein, the first antenna array is disposed on a first substrate and the second antenna array is disposed on a second substrate.

6. The communication terminal of claim 1, further comprising:
first switching circuitry between the radiators in the first array and a first transceiver chain;
second switching circuitry between the radiators in the second array and a second transceiver chain; and control circuitry configured to:
control the first switching circuitry to activate a first set of radiators in the first array, and
control the first transceiver chain to convey first radio-frequency signals at a first phase using the radiators in the first set of radiators.

7. The communication terminal of claim 6, further comprising a first lens overlapping the first array of radiators and a second lens overlapping the second array of radiators.

8. The communication terminal of claim 6, wherein the control circuitry is further configured to:
control the second switching circuitry to activate a second set of radiators in the second array; and control the second transceiver chain to convey second radio-frequency signals at a second phase using the radiators in the second set of radiators.

9. The communication terminal of claim 8, wherein the control circuitry is configured to adjust the first and second phases to produce a combined signal beam in a selected direction using the first and second sets of radiators.

10. The communication terminal of claim 8, further comprising a third transceiver chain coupled to the first switching circuitry, the control circuitry being further configured to:
control the first switching circuitry to couple a third set of radiators in the first array to the third transceiver chain, and control the third transceiver chain to convey third radio-frequency signals using the third set of radiators, wherein the first radio-frequency signals are within a first frequency band and the third radio-frequency signals are within a second frequency band that is different from the first frequency band.

11. The communication terminal of claim 8, further comprising a third array of radiators, a third transceiver chain, and third switching circuitry between the radiators in the third array and the third transceiver chain, wherein first lens overlaps the third array of radiators and the control circuitry is further configured to:
control the third switching circuitry to activate a third set of radiators in the third array, and
control the third transceiver chain to convey third radio-frequency signals using the radiators in the third set of radiators, wherein the first radio-frequency signals are within a first frequency band and the third radio-frequency signals are within a second frequency band that is different from the first frequency band.

12. The communication terminal of claim 8, wherein a first radiator in the first set is configured to transmit the first radio-frequency signals at the first phase over a first signal beam oriented in a first direction and wherein a second radiator in the first set is configured to concurrently transmit the first radio-frequency signals at the first phase over a second signal beam oriented in a second direction that is different from the first direction.

13. The communication terminal of claim 2, further comprising a first lens overlapping the first array of radiators, first switching circuitry between the radiators in the first array and a first transceiver chain, a second lens overlapping the second array of radiators, second switching circuitry between the radiators in the second array and a second transceiver chain, and the control circuitry configured to:
control the first switching circuitry to activate a first set of radiators in the first array, and
control the first transceiver chain to convey first radio-frequency signals at a first phase using the radiators in the first set of radiators.

14. The communication terminal of claim 2, wherein the non-zero angle is ninety degrees.

15. The communication terminal of claim 2, wherein the first antenna array is disposed on a first substrate and the second antenna array is disposed on a second substrate.

16. The communication terminal of claim 2, wherein the pattern of concentric rings in the first array comprises three concentric rings around a first point, the pattern of concentric rings in the second array comprises three concentric rings around a second point, and the first point is laterally offset from the second point.

17. The communication terminal of claim 3, wherein the component comprises a curved component.

18. The communication terminal of claim 3, further comprising:
a third array of radiators on a third substrate having a third lateral surface, a third lens overlapping the third array of radiators and mounted to the third lateral surface, wherein the third lateral surface is non-parallel with respect to both the first lateral surface and the second lateral surface.

19. The communication terminal of claim 3, further comprising first switching circuitry between the radiators in the first array and a first transceiver chain and second switching circuitry between the radiators in the second array and a second transceiver chain.

20. The communication terminal of claim 19, further comprising control circuitry configured to:
control the first switching circuitry to activate a first set of radiators in the first array, and
control the first transceiver chain to convey first radio-frequency signals at a first phase using each of the radiators in the first set of radiators.

* * * * *